Aug. 10, 1965   J. M. BLACKHALL   3,200,200
AUTOMATIC TOLL TICKETING SYSTEMS
Filed Aug. 24, 1960   10 Sheets-Sheet 7
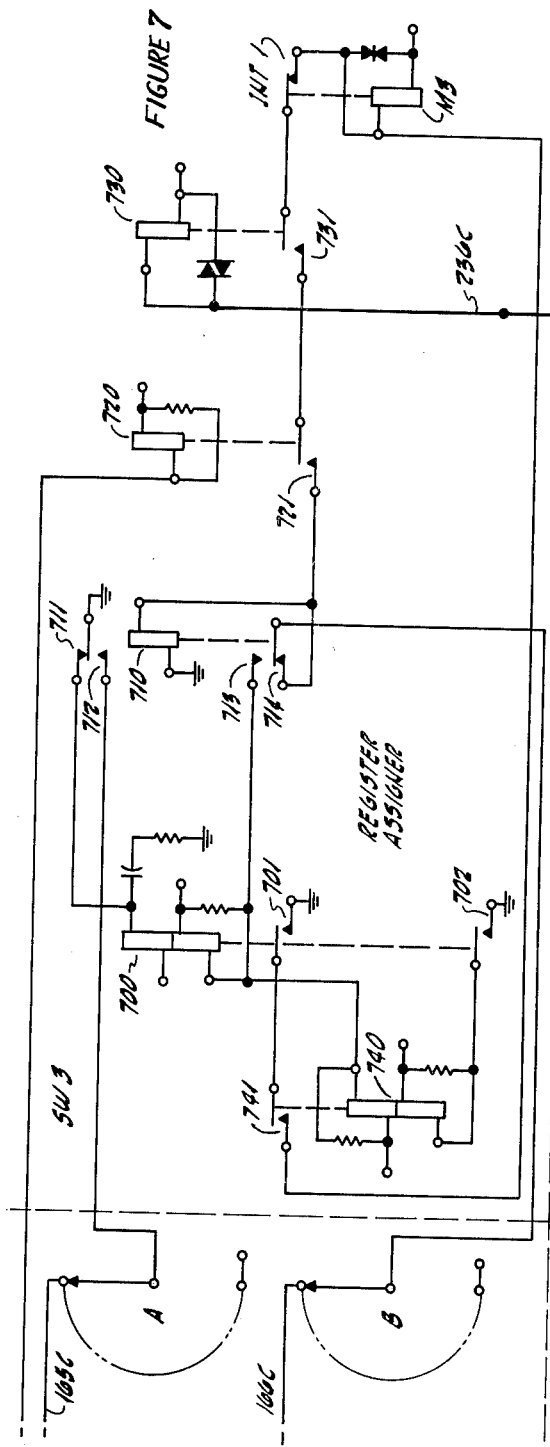
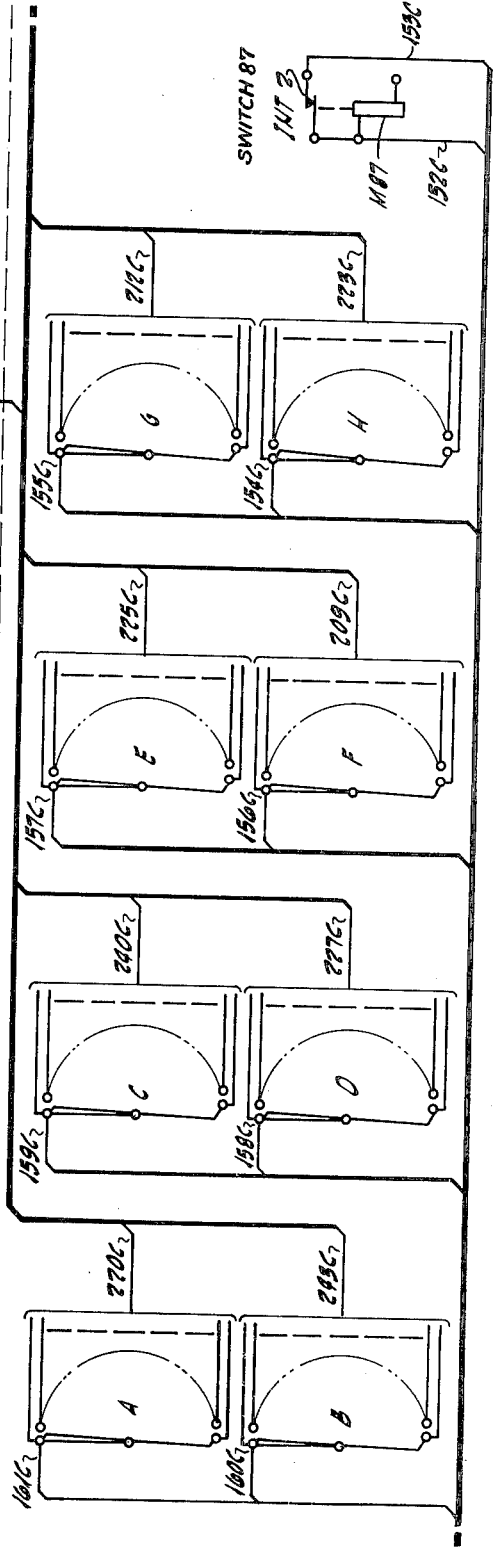

Aug. 10, 1965    J. M. BLACKHALL    3,200,200
AUTOMATIC TOLL TICKETING SYSTEMS
Filed Aug. 24, 1960    10 Sheets-Sheet 8

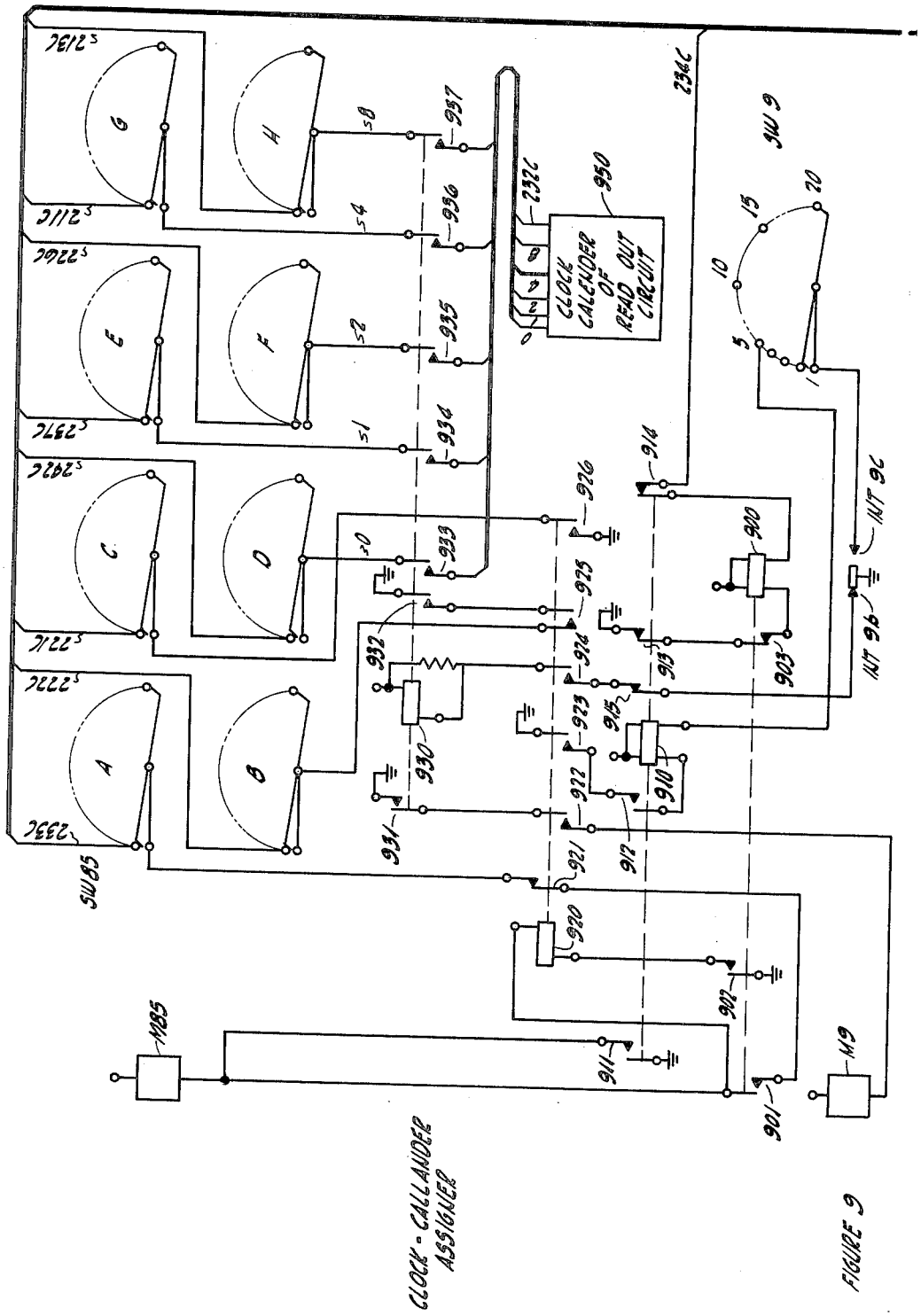

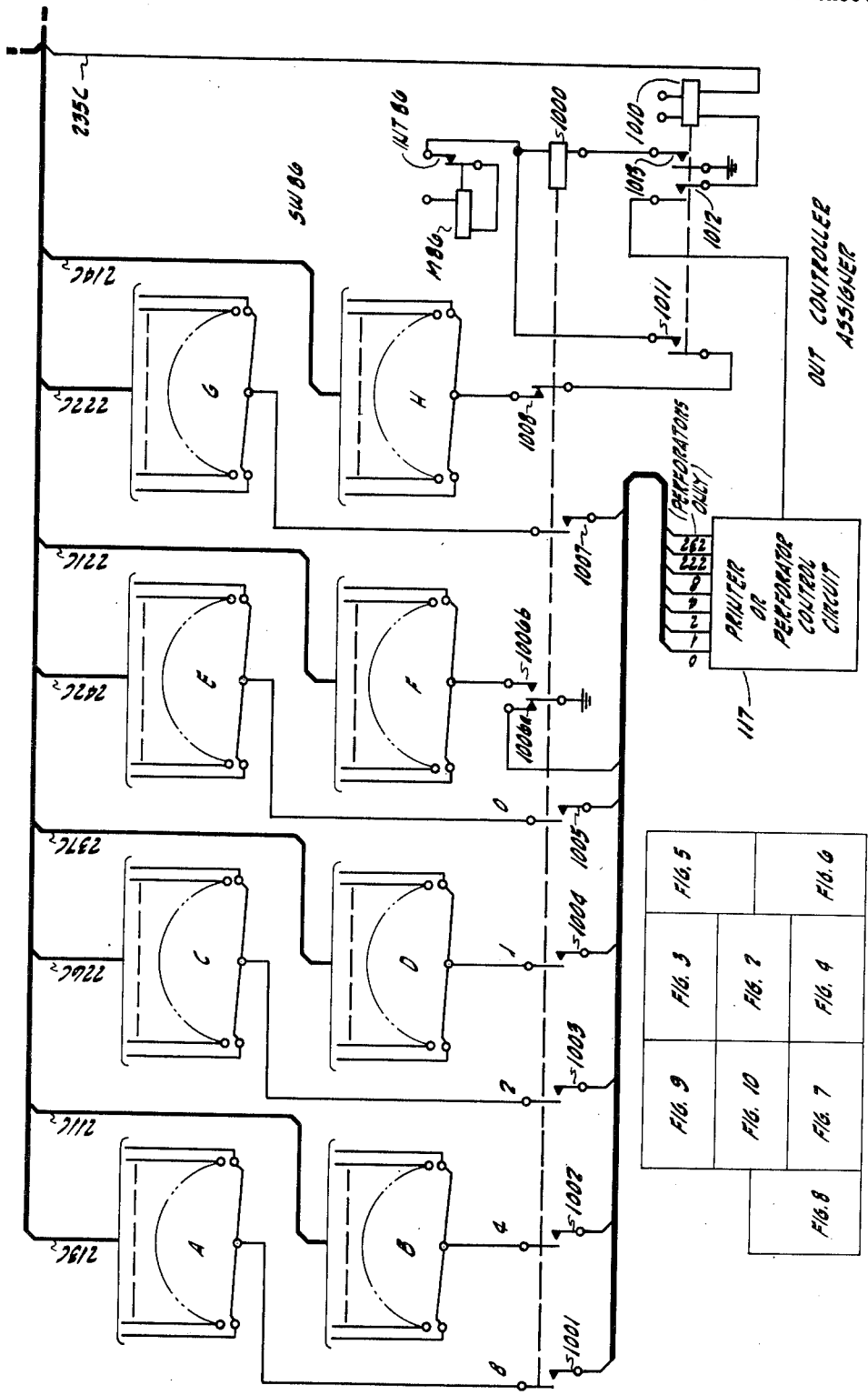

United States Patent Office 3,200,200
Patented Aug. 10, 1965

3,200,200
AUTOMATIC TOLL TICKETING SYSTEMS
James M. Blackhall, La Grange, Ill., assignor to International Telephone and Telegraph Corporation, New York, N.Y., a corporation of Maryland
Filed Aug. 24, 1960, Ser. No. 51,742
16 Claims. (Cl. 179—7.1)

This invention relates to automatic toll ticketing systems and more particularly to ticketers used in such systems.

There has been a steady progression in the field of telephony toward the use of automatic switching equipment. Originally, this automatic equipment was used almost exclusively in the local call portion of the telephone field. More recently automatic switching systems have been developed for use in toll call systems. The automation of the toll plant has passed successively through two stages, first that of regional and then that of nationwide operator-controlled toll dialing. Recently it has reached a third stage, that of nationwide automatic subscriber toll dialing.

While many different types of automatic toll ticketing systems have been provided, each has utilized complicated and expensive ticketing control systems or ticketers. Since the ticketers are connected to serve an individual call throughout the entire period of that call, any simplification of the ticketer results in a substantial saving both in initial investment and maintenance costs for the entire system. In the systems provided thus far ticketers have been utilized to accomplish registering functions, to accomplish control of printing or perforating means and, in general, to accomplish functions in addition to those required of a ticketer which basically are: store the data necessary for the production of the record of the toll call, supervise the answer and release of the call, and deliver the stored data to a printer or perforator. A better plan involves separating the ticketing control equipment from the signalling and rating equipment. Since no additional cost is involved, substantial savings can be realized because the signalling and rating apparatus are connected to serve a given call only during the time of actual use in that particular call, thus enabling each such apparatus to service several ticketers. Moreover, it is no longer necessary to hold the talking connection for the duration of the ticketing process. Quite the contrary, the switch train may be released as soon as the call is completed and the ticketer continues to function until all pertinent data is recorded. In other words, the basic premise is that there is no fundamental reason for the high degree of centralization that is utilized in the existing automatic toll switching systems, instead such equipment should be dispersed in the same degree as local switching equipment.

Accordingly, it is an object of the present invention to provide a novel and simplified ticketer.

A further object of this invention is to provide a ticketer for utilization in automatic toll ticketing systems regardless of variations in the type of service offered.

Another object is to provide ticketers which perform only the basic operations required of the ticketer, thus eliminating the need for holding a large amount of equipment for the duration of a call. A related object is to provide a ticketer that, when idle, attracts a register-sender, thus eliminating a time-consuming switching function which might otherwise be required after a call is received and while expensive switching equipment is being held.

Still a further object of the invention is to provide a ticketer for giving economical service in both small and large exchanges. More specifically, an object is to give economical service when there are as few as 50,000 tickets per year. In this connection, it is an object to provide a toll ticketing system which monopolizes only a minimum amount of expensive equipment during any given call.

Briefly, an exemplary embodiment of this invention accomplishes these and other objects by means of a circuit comprising only six telephone-type relays, a timing device such as a timer relay, a switching device such as a multi-level rotary stepping switch and a storage device. Any storage device such as a bank of relays stores the information required for the ticketer to make a record of the toll call. The telephone relays supervise the answer and release of the call. The switching device is used to deliver the data to the storage device and to read-out the storage device.

In this preferred embodiment of an automatic toll ticketing system, the ticketers are associated at random with idle registers by preselecting rotary switches. Upon seizure of the ticketer-register combination, the ticketer is made busy and the register accepts the necessary information for both setting up the call and identifying the calling party. This information may be transmitted either manually by a calling subscriber or automatically by an identifier. Therefore, the register transmits the called number to set an automatic switch train. The talking circuit is cut-through the ticketer and the register delivers the stored data to the ticketer and leaves the connection.

Upon receipt of answer supervision, the ticketer calls in a clock calendar and records the time, rate and date of connection.

In case of wrong numbers, the connection may be released any time before the operation of a billing relay in the ticketer, which is energized responsive to the operation of a timing relay. Thereafter, the ticketer and register (or ticketer only) restore to normal and the stored information is cancelled.

If the called station is busy, the ticketer delivers tone at the flashing rate to the calling subscriber. If the called station does not disconnect promptly, the call is released and busy tone is returned to the calling subscriber. When the calling subscriber releases after billing, the ticketer delivers the stored information to either a printer or perforator and restores to normal. On release by the called party only, the ticketer counts out a delay of 20 seconds, opens the originating loop, drops the out-trunk, delivers the stored information to the printer or perforator and restores to normal.

The above-mentioned and other features and objects of this invention and the manner of attaining them will become more apparent and the invention itself will be best understood, by reference to the following description of an embodiment of the invention taken in conjunction with the accompanying drawings, wherein:

FIG. 7 is a schematic circuit diagram showing a rotary preselecting switch and assigner circuit for connecting registers and ticketers;

FIG. 9 is a schematic circuit diagram which shows a switch and the circuit for connecting calendars to the ticketers;

FIG. 10 is a schematic circuit diagram showing a switch and the circuit for connecting printer control circuits to the ticketer; and FIG. 11 illustrates a mode of combining FIGS. 2–10, inclusive, to form a unified system.

Simple and specific terms are used in the following specification, where possible, to facilitate an understanding of the invention. However, it should be understood that the use of these terms is not to act in any manner as a disclaimer of the full range of equivalents which is normally given under established rules of patent law. To illustrate, the attached drawings show a relay storage system whereas other types of storage apparatus, such as magnetic storage devices, may be used. Also, the attached drawings indicate a system utilizing stepping switches for interconnecting the various subassemblies. However, other types of devices, such as crossbar switches, could readily serve the same function. Still further, the heavily inked rectangle (No. 111 of FIG. 1) indicates that portion of the system which is shown in detail by means of FIGS. 2–6. The remaining blocks of FIG. 1, that are shown by lightly inked rectangles, are items which are well known to those skilled in the art. Any suitable equipment may be used to provide the functions represented by these blocks. Quite obviously, other examples could be selected to illustrate the manner in which the specific terms that have been used are entitled to a wide range of equivalents.

BRIEF DESCRIPTION

Figure 1:
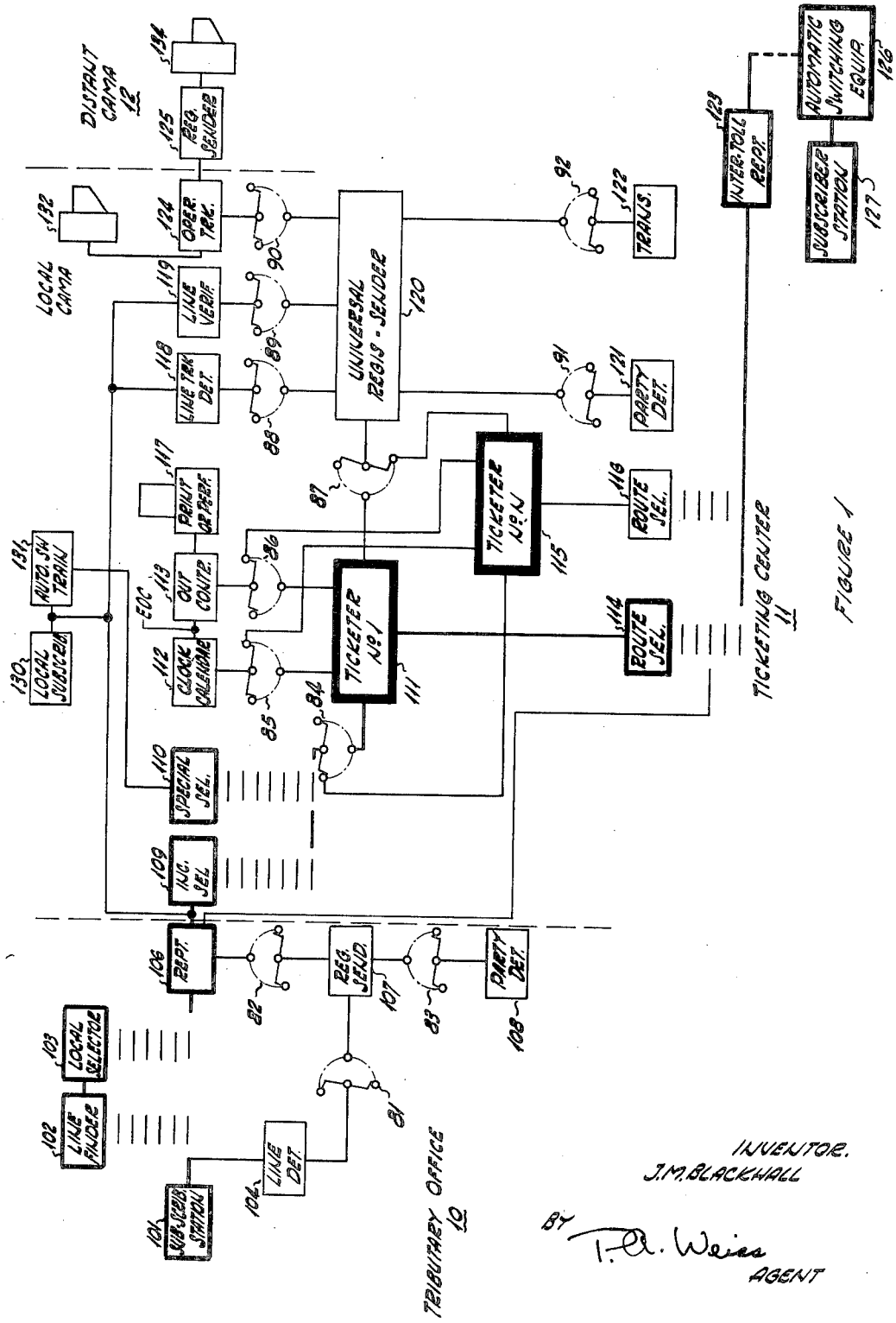
FIG. 1 shows by block diagram an automatic toll ticketing system, utilizing the subject invention.
Figure 2:
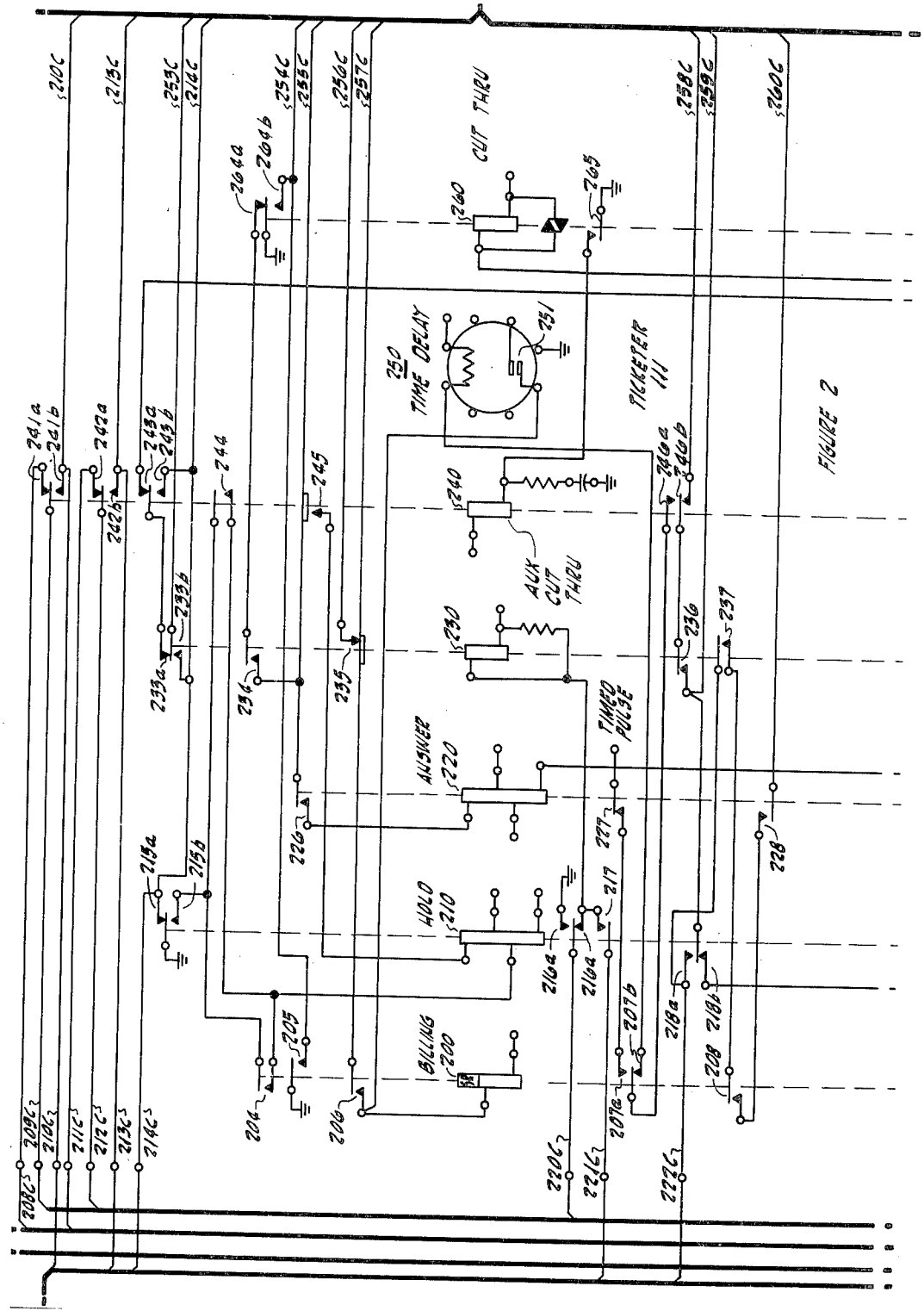
FIGS. 2–6 show by schematic circuit diagram details of block 111, the ticketer, as shown in FIG. 1.

FIG. 1 shows by block diagram one example of an automatic toll ticketing telephone system which is useful for explaining how the subject invention operates. This system includes a tributary office 10, a ticketing center 11, and a centralized automatic machine accounting (CAMA) office 12. In this exemplary system, a calling subscriber station 101 is connected to a called line 127 when the calling subscriber sends a total of 14 digits. The first three of these digits are used to reach a register-sender in the ticketing center. The following ten digits are the nationwide "terminating number" (i.e., a 3-digit area code followed by a 7-digit called line directory number). The last digit controls ringing.

The tributary office includes a linefinder 102 and a local selector 103, which give access to a plurality of repeaters, such as 106. Coupled to the repeater 106 on a percentage basis by a rotary switch 82 is a register-sender 107. Coupled to register-sender 107, also on a percentage basis, by a rotary switch 83 is a party-detector circuit 108 that identifies the one of a number of party line subscribers who is making a call. Between the subscriber station 101 and the register-sender 107 is a line-detector 104, the connection being completed by a rotary switch 81.

The line detector 104 identifies the directory number of the line extending to subscriber station 101, which number is then stored in register-sender 107. Thereafter, party detector 108 stores an additional digit in register-sender 107, thus completing storage of the directory number of subscriber station 101.

The ticketing center 11 includes a conventional incoming automatic switch train here depicted as an incoming selector 109, and a special selector 110. Associated with selector 110 are a number of ticketers 111, which are distributed on a percentage basis by rotary switch 84. This ticketer is individually connected to the incoming switch train for the duration of a given call. However, it performs only the most basic operations required of a ticketer. When necessary, and during the progress of a call, the ticketer sequentially calls in any number of associated circuits which give specialized service. As soon as these specialized services are completed, the associated circuits are released. Thus, only the minimum equipment incorporated in the ticketer is held and the need for holding a large amount of equipment for the duration of the given call is eliminated.

More particularly, the circuits associated with the ticketer include a clock calendar 112, an out controller 113, a printer or perforator 117, a line trunk detector 118, a line vertifier 119, a universal register-sender 120, a party detector 121, a translator 122 and an operator trunk circuit 124. All of these circuits are interconnected on a percentage basis by a number of rotary switches 85–92 in a manner which will be obvious to those skilled in the art.

The clock calendar 112 is of conventional design providing control signals which indicate: the time, day, month, year, and other pertinent data such as high-low billing rate. All of this is accomplished with full consideration of Sunday and holiday rates and with corrections for leap year.

The out controller 113 is a circuit which converts signals received from the ticketer 111 into signals for controlling the printer or perforator 117. While the printer may take any suitable form, it may conveniently be a modified adding machine, as will be apparent to those skilled in the art.

The line trunk detector 118 provides means for automatically determining the calling line number when a local subscriber is the calling party. The calling line identifying number is then transmitted to register 120 by the line trunk detector.

The party detector 121 is used when a local subscriber on a party line initiates the call. It provides means for determining the calling party number and transmitting that information to register 120.

The line verifier 119 provides means for checking the calling party's number in a "dial your own number" system for identifying the calling party.

The universal register-sender 120 provides means for receiving from the calling subscriber's dial, the digits of the called subscriber's telephone number, and for receiving the calling subscriber's telephone number either from the calling subscriber, a detector circuit, or from an operator. The register then outpulses the called number to the switch train at the direction of a translator. After outpulsing the register transfers all the call data plus its own number to the ticketer and then releases. It should be noted that the ticketer 111 connects directly to the register-sender 120 via a data transfer link 87 (as distinguished from a speech path); therefore, the call data may be quickly and easily transferred, in parallel, from the register to the ticketer. This provides for an economical construction and a rapid transfer of data.

The translator circuit 122 provides the digits required for routing a call when more than one set of trunks are used to carry toll traffic.

The operator's trunk 124 provides means for enabling the operator to dial or key-in the calling party's number after the operator obtains the number verbally from the calling party. Provision is made for receiving this information either from a local or distant operator.

Finally, the ticketing center 11 includes route selectors 114, 116, which are numerically controlled from the ticketers 111, 115, respectively, to interconnect the tributary office 10 and an intertoll repeater 123 in any conventional manner. Connected to repeater 123 is any suitable automatic switching equipment 126 and an associated called subscriber station 127. The physical location of equipment 126, 127 is not important—it may be in the ticketing center 11 or in a distant exchange.

The talking path extending through the telephone system of FIG. 1 is identified by the heavily inked conductor leading through boxes 101, 102, 103, 106, 109, 110, 111, 114, 123, and 126 to 127.

When necessary to provide manual supervision, equipment in the ticketing center 11 including operator trunk circuit 124 may call in either an operator 132 in the ticketing center or to an operator 134 in the CAMA office 12.

The telephone system of FIG. 1 operates in the following manner. Closure of a line loop in the tributary office 10 by removal of a handset at calling station 101 connects the calling line through linefinder 102 to local selector 103. Dial tone is returned and the calling subscriber dials a complete complement of fourteen digits. The first three digits indicate a long distance call, the second three digits indicate an area code, the called number is made up of the next seven digits and the last digit is the "ring" digit. During the first three digits, the call is extended via switches 103, 106, 109, 110 to a register-sender 120 by way of ticketer 111 and rotary switches 84, 87 which provide a percentage distribution.

Line detector 104 determines which line is busy. This information, along with the ring digit, is transferred to register-sender 107 through switch SW81. Party detector 108 determines the calling party directory number based on the information in register-sender 107 and transfers this information back to register-sender 107, which retransmits it as a seven digit number to register-sender 120. Therefore, register-sender 120 stores seventeen digits of directory information, i.e., three digits of area code, seven digits of called party directory number and seven digits of calling party directory number. To this, register-sender 120 adds a single digit which serves to distinguish it from all other register-senders. Therefore, the register-sender contains a total of eighteen digits for transmittal to the ticketer.

During the time interval while the register-sender 107 is sending the calling number to register-sender 120, the call may be cancelled if the calling subscriber hangs up. However, during this same time interval, a manipulation of the dial at station 101 does not interfere with the transmission of the calling line directory numbers between register-senders 107 and 120.

While the second three or area digits are being stored, register-sender 120 puts in a call for a translator, such as translator 122. When connected to translator 122, register-sender 120 transfers the digits one at a time over 2-out-of-5 leads to registration relays (not shown in FIG. 1) in translator 122. The translator determines whether the area code is one requiring a second translation and, if it is, marks the register with a single digit to indicate an arbitrary number further identifying the area in question. Thereafter, the translator releases from the register-sender.

When the next three digits, representing the office code, are stored in register-sender 120, the translator 122 is seized and the same process of transferring the office digits from the register-sender 120 to the translator takes place. In addition, the register delivers the previously stored area code to the translator which, in any well known manner, selects a route through either direct or alternate route relays. The route relays may have strapped-in directives of up to seven digits. Six of these digits represent the maximum routing directive which may be outpulsed into route selector 114 and automatic switching equipment 126. The seventh directive digit selects that part of the 10-digit terminating number which is to be outpulsed to the switching equipment. The outpulsed part of the original 10-digit terminating number may be any number of digits between ten and four. The directive digits are stored in register-sender 120 and translator 122 is released.

Responsive to receipt by the register-sender of the complete translated directive, it begins outpulsing to the automatic switching equipment via ticketer 111. Outpulsing is under control of the usual start and stop signals and also of busy-flash signals of 30, 60 and 120 i.p.m. As soon as register-sender 120 is through outpulsing to the automatic switch train, it delivers a cut-through pulse to its associated ticketer 111 to disconnect the leads which heretofore had been used for connecting register-sender 120 to incoming selector 109 and route selector 116, respectively. These register leads are now connected to a common means for controlling the storage of data in the ticketer. Conveniently, this means takes the form of a rotary switch providing a ticketer-sequence control. Thereafter, the register-sender 120 transmits over these leads the eighteen digits of ticketing data which is stored in the ticketer storage apparatus. This is the second time that the data is read-out of the register sender.

Responsive to the receipt of all of this data, which in this embodiment of the invention is delivered at the rate of twenty pulses per second, the ticketer grounds a hold lead to release the register-sender from the ticketer.

When information is no longer transmitted from the register-sender, the ticketer responds by going into a read-in condition and by waiting for answer supervision signals or for a flash signal. The read-in condition is to provide for storage of call information in the ticketer, as required. Three types of signals can be returned over a supervisory lead extending to the ticketer from the calling switch train. One is the absence of any signal which indicates no answer, two is a busy or trouble flash at the 30, 60 or 120 i.p.m. rate, and three is a ground answer supervision signal to indicate called party answer.

If a flash of 30, 60 or 120 i.p.m. is received, the control means or sequence switch in the ticketer is driven to open the original line loop, and to cause lockout or return dial tone, depending upon the characteristics of the local automatic central office switching system. While the sequence switch is being thus driven, the calling subscriber receives busy tone from the ticketer.

If the called subscriber answers, a timing relay in the ticketer operates after approximately six seconds to cause billing. If, on release, the called party hangs up before the calling party, the sequence switch of the ticketer will be driven by a source of timed pulses to a point at which the originating line loop will be opened and the calling party put on dial tone or lockout. At this time the out controller 113, which may be of the type used for controlling either a printer or a tape perforator, will cause a record of the call to be made. If the release is made by the calling party, the same action as described above takes place without the timed interval of approximately twenty seconds. Upon restoration of the cut-through relays because of the release of the call or upon restoration of the sequence switch to normal due to the timed release of the call, a request is made for an output control circuit such as that shown in FIG. 1. Responsive to the connection of an output control circuit to the ticketer, the call data is delivered to either a printer or a perforator. Responsive to the completion of the delivery of ticket data, the ticketer releases and, subsequently, once again becomes available for another call, responsive to the attachment to another idle register.

Summarizing the operation of the ticketer throughout this call: ticketers are associated with idle registers, at random, over preselecting apparatus such as preselecting rotary switch 87 associated with the registers. All ticketers appear on levels of the register switches and the ticketer-register group is accessed from ticketing office selectors through preselecting devices, such as preselecting rotary switch 84, either on a full-availability basis or they can be graded across the incoming selectors. Seizure of the ticketer-register combination by any searching remote selector, or any local first or incoming trunk, or special service stepping selector, causes the ticketer to be made busy and connects the selector through to the register, which then accepts the necessary information for both setting up the call and identifying the calling party.

Subsequent to the storage of the called number in the register, the called number is transmitted after a translation cycle and then the ticketer is cut-through; whereupon, the register delivers the untranslated called data to the ticketer and subsequently breaks the connection. When the calling subscriber answers, the ticketer calls in a calendar which transmits the time of connection for storage in the ticketer. The ten or hours digit of the time of connection also contains a high-low rate indication for the call. When the call is released any time before the operation of the billing relay, the ticketer is restored to normal without transferring the information stored in it to a printer or perforator. However, upon normal release after operation of a billing relay, which operates responsive to the energization of a timing relay, the ticketer delivers the stored information to either a printer or a perforator and then restores to normal. It should be noted that this ticketer performs only the essential functions incumbent upon a ticketer.

DETAILED DESCRIPTION

It is thought that a more complete understanding will result from the following detailed description of a preferred embodiment of the invention as it is shown in the detail drawings, FIGS. 2–10, inclusive, when joined as shown in FIG. 11.

Seizure by register

When any ticketer in the central office, such as ticketer 111 in FIG. 1, is standing idle without a register connected thereto, control means, here shown as ticketer-sequence switch, SW1 (FIG. 6), is normal. Relays 200, 210, 220, 230, 240, 250 and 260 are all de-energized and indicator lamp 300 is dark. Also, lead 220c (FIG. 2) is not grounded; however, lead 236c (FIG. 4) is grounded over a circuit that may be traced from the ground on off-normal SW1 switch contacts ON1b, through lead 253c, through normally closed contacts 233a, 243a, lead 271c, normally closed contacts 414 to lead 236c. The ground on lead 236c is extended to a ticketer-assigner circuit (FIG. 7), where it operates relay 730 over an obvious circuit.

Means are provided for interconnecting a register and an idle ticketer. More particularly, if any register is idle, a ground is extended from that register to operate relay 720, the circuit being through normally closed contacts 808. If a register is idle, relay 710 operates responsive jointly to the operation of relays 730 and 720, over a circuit that can be extended from battery on magnet M3 (FIG. 7), interrupter contacts INT1, contacts 731 and 721 operated to the closed position, and through the coil of relay 710 to ground. The current, however, is insufficient to operate the magnet M3 of switch SW3 over this circuit because the winding of relay 710 has a high resistance.

Responsive to the operation of relay 710 contacts 712 close, operating relay 840 over a circuit that can be traced from ground through contacts 712, the wiper on level A of SW3, lead 165c, contacts 811 normally closed and through the coil of relay 840 to battery. Note that if switch SW3 in this position were connected to a busy register, there would be a ground on lead 166c which would extend from contacts 802 through level B of switch SW3, contacts 714, 721 and 731 to ground the coil of magnet M3 through interrupter contacts INT1, and responsive thereto switching magnet M3 would operate and step the switch to its next position. Relay 710 would be shunted by ground extending through contacts 714 and would not operate. Switch SW3 continues to step in this manner until an idle register is found, as denoted by an absence of ground on lead 166c. Responsive to the interconnection of an idle register and an idle ticketer, relay 710 operates over a circuit previously traced.

Responsive to the operation of relay 840, ground is extended to relay 800 over a circuit that can be traced from ground through normally open contacts 842 to the coil of relay 800. At the same time lead 161c, which is connected to the wiper of level A of switch SW87 (FIG. 7) and extends through to the other side of relay 800, over a circuit that can be traced from switch SW87, through normally closed contacts 801a, normally open contacts 841 now operated to the closed position, and to the left-hand terminal coil of relay 800. When ground is on lead 161c (from contacts 216a via conductor 220c) both sides of the coil of relay 800 are grounded and it does not operate. Switch SW87 will step to its next position because magnet M87 is energized by the ground on lead 161c extended through contacts 801a, 841, lead 153c and contacts INT2. Switch SW87 will continue to step until an ungrounded lead 161c is found to indicate an idle register.

Lead 161c is connected through the contacts of level A of switch SW87 to leads 220c on all ticketers; therefore, an idle ticketer, marked by an absence of ground (open contacts 216a) on lead 220c, will complete the circuit operating relay 800. In greater detail, supposing that in position 1 ticketer-access switch SW87 is connected to a busy ticketer, then lead 220c is grounded over a circuit that can be traced from ground through contacts 216a to lead 220c, level A of switch SW87 to lead 161c, contacts 801a and 841 to the one side of relay 800 and to lead 153c. Lead 153c, in turn, is connected through the interrupter contacts INT2 to the battery of the coil of magnet M87. Thus, when switch SW87 is connected to a busy ticketer, ground on lead 220c prevents the operation of relay 800 and actuates magnet M87 to step the ticketer-access switch SW87. Stepping continues until ticketer-access switch SW87 locates an idle ticketer marked by battery on lead 220c over a circuit that can be traced from battery on the coil of relay 230 through contacts 216b to lead 220c. This battery is then extended through to lead 153c over a circuit previously traced. Battery on lead 153c prevents actuation of magnet M87 because both sides of its coil connect to battery. Relay 800 operates because it has ground on one side and battery (through relay winding 230) on the other side of its coil. Therefore, switch SW87 stops stepping and relay 800 operates to mark the register (FIG. 8) busy.

Responsive to the operation of relay 800, a self-locking circuit is completed from ground through contacts 861, 803, 891, the coil of relay 800 to battery on lead 153c (from contacts INT2). Lead 153c is disconnected from lead 161c when, responsive to the operation of relay 800, contacts 801a open; and, instead, lead 161c is now connected to the ground applied to the coil of relay 800 through contacts 801b. The current flowing through the windings of magnet M87 and relay 800 is insufficient to operate magnet M87 but is sufficient to operate relay 800. Also responsive to the operation of relay 800, a circuit is completed through contacts 804 and 805 to connect the upper and lower coils of line relay 830 and to leads 160c and 159c, respectively, via contacts 821b and 822b. Relay 810 is also operated over an obvious circuit when ground is extended through contacts 806. Ground is extended through contacts 802 to lead 166c to cause the ticketer-assigner circuit to disengage itself from this particular register by energizing magnet M3 via contacts 714, 721, 731 and INT1. Ground is removed from lead 161c whereby this particular register no longer causes operation of the register-assigner circuit (FIG. 7).

The operating circuit for relay 840 breaks when contacts 811 open, responsive to the operation of relay 810. At this point the register (FIG. 8) is connected to the ticketer (FIGS. 2–6). Relay 230 in the ticketer and relays 800 and 810 in the register are operated.

Means are provided for marking the register-ticketer as idle to an incoming selector. Retrogressing in the description to fill in the pertinent details, responsive to the operation of relay 230, contacts 331 close to complete a circuit from a 60 i.p.m. ground pulse source (not shown, but connected to lead 202c) contacts 331, 322a, 312a, 361a, lead 201c, and through lamp 300 to battery, thereby flashing lamp 300 at 60 i.p.m. rate to indicate the seizure of the ticketer by a register. Also responsive to the operation of relay 230, contacts 332a open to remove the ground extended through contacts 324a, 313a, lead 206c and preselecting switch SW84 to the auxiliary sleeve AS to the incoming selector 109. When contacts 433 open, the removal of ground from lead 230c permits the interconnected register-ticketer to be seized by an absence of ground searching incoming selector 109 in any well known manner. Previously, the sleeve to selector 109 extended over the circuit from ground on contacts 445 through contacts 422, 401, 433, and lead 230c to sleeve S.

Also responsive to the operation of relay 230, normally open contacts 332b close to extend resistance battery to lead 206c through a circuit that can be traced from battery through resistor R1, through normally closed contacts 362a, through the now closed contacts 332b, the normally closed contacts 324a and 313a to lead 206c. Resistance battery on lead 206c permits any resistance battery-seeking selector to seize this ticketer and its associated register in any well known method. Prior to the operation of relay 230 ground was extended to auxiliary sleeve AS lead 206c through normally closed contacts 332a, 324a and 313a. This ground on lead 206c effectively detoured resistance battery-seeking incoming selectors and thereby prevented the seizure of a ticketer having no attached register.

The operation of relay 230 causes normally open contacts 234 to close, thus preparing a locking circuit for answer relay 220 that can be traced from ground through normally closed contacts 264a, contacts 234 to normally open contacts 226. Contacts 432 close and extend battery through the coil of relay 260 to lead 225c which is connected to level E of ticketer-access switch SW87 (FIG. 7). The battery on the lower winding of relay 220 is extended to level H of the ticketer-access switch SW87 through a circuit that can be traced from the battery on the coil of relay 220 through contacts 431, contacts 462, lead 223c, to level H of ticketer-access switch SW87. The battery extended through these two leads, i.e. lead 223c and lead 225c, has no effect on the register at this time. Also the following contacts on relay 230 operate at this time with no effect: normally closed contacts 233a, 235, 236, 237, 339a and 435 are opened; normally open contacts 233b and 434 are closed.

The ticketer-register combination is now prepared for seizure responsive to the receipt of a toll call at incoming selector 109.

Seizure by toll call

When the calling subscriber removes his handset from the hook switch, a circuit is completed that operates line relay 830 in the register of the ticketer-register combination. The circuit can be traced from battery on the lower right terminal of line relay 830 in the register through contacts 822b, contacts 805, lead 159c, the wiper on level C of ticketer-access switch SW87, lead 240c, through contacts 447 normally closed to lead 241c, which is connected to the "ring" lead of the incoming selector 109 through a switch train (not shown), to the subscriber's line circuit and back to the "tip" (not shown) lead 244c in the ticketer through contacts 449, lead 243c which connects to level B of ticketer-access switch SW87, lead 160c, contacts 804, contacts 821b, and through the upper coil of relay 830 to ground.

Subscriber dialing causes the line relay 830 to release responsive to the dial digit interruptions. Each time that relay 830 releases, contacts 834 close and pulses are stored in storage devices 890, indicated by the block diagram in FIG. 8.

Responsive to the operation of line relay 830, answer relay 220 in the ticketer is operated over a circuit that extends from battery on the lower winding of relay 220 through contacts 431 and 462, lead 223c to level H of the ticketer-access switch SW87, from the wiper of level H through lead 154c into the register, contacts 809, 823b, and contacts 832 on the line relay 830, to ground. Also responsive to the operation of relay 830, other register relays operate, among which are the slow to release "hold" relay 850, which operates over a circuit which can be traced from battery on the coil of relay 850 and contacts 831 to ground. Relay 850 holds during dial pulsing responsive to its own slow release characteristics.

Responsive to the operation of the "hold" relay 850, auxiliary relay 860 operates over an obvious circuit including contacts 852. Responsive to the operation of relay 850, contacts 851 close to apply a ground in place of the ground removed by the opening of normally closed contacts 861 for holding relay 800.

To indicate seizure by a toll call, indicator lamp 300 changes from a 60 i.p.m. flash to a 120 i.p.m. flash when the answer relay 220 operates in the ticketer. More specifically, normally closed contacts 322a, over which indicator lamp 300 was previously connected to the 60 i.p.m. ground source, open while the normally open contacts 322b, close, completing a circuit from lead 203c connected to a 120 i.p.m. ground source through contacts 322b, through normally closed contacts 312a, 361a, and lead 201c to the battery on indicator lamp 300.

Relay 220 locks itself in when contacts 226 are operated to a closed position, thus completing a circuit from battery on relay 220 through its coil, contacts 226, 234 and 264a to ground. The operation of relay 220 also causes lead 206c to be grounded at contacts 324b thereby completing a connection to the auxiliary sleeve AS of the incoming selector 110. At this same time contacts 324a open, breaking the previously traced idle marking circuit that connected lead 206c to resistance battery on contacts 362b.

It should be noted that the ticketer 111 can function effectively with an incoming selector that is a resistance-battery seeking type device as described herein. Or, by simple circuit changes obvious to those skilled in the art, the ticketer may be made amenable to other type selectors, such as ground-searching selectors or absence-of-ground-searching selectors.

Also, as a result of the operation of answer relay 220, the ground that extended to lead 233c through contacts 423b is removed; however, lead 233c is still grounded via a circuit that may be traced from ground on the wiper of level C of the ticketer-sequence switch SW1 (FIG. 6) in positions 1-20, lead 261c and contacts 423a to lead 233c. (The absence of ground on lead 233 is a call for a clock calendar as described in detail below). Ground is extended to lead 232c via a circuit that can be traced from ground through contacts 445 and 421 to lead 232c. The ground on this lead has no immediate effect. The following contacts on answer relay 220 are operated with no effect at this time: 321a, 325a, 325b, 227, 228, 423a, 423b and 424.

After all of the digits dialed by the calling subscriber are stored in circuit 890, the terminating numbers are sent to the route selector 114 and switch train 126 (FIG. 1), on a loop pulsing basis via conductors 170c-174c (FIG. 8), in a well known manner.

It should be noted that the ground on lead 223c, originally used to operate relay 220, is also extended to the outgoing selector over a circuit that can be traced from lead 223c through normally closed contacts 462, normally closed contacts 464, to lead 224c, which is connected to the auxiliary sleeve AS lead of the outgoing selector 114. Lead 245c, which extends the tip lead from route selector 114 to the relay 830 in the register over a circuit previously traced, is connected to the tip lead 244c of the incoming selector 109 through contacts 449 normally closed, lead 244c and rotary preselecting switch SW84. The tip lead of the route selector 114 is connected through lead 245c to open contacts 469. Lead 231c, which is connected to the sleeve S of the route selector 114, is connected to open contacts 443. The auxiliary tip AT lead of the route selector is connected to lead 208c in the ticketer and through contacts 241a, lead 209c, level F of SW87, to lead 156c of the register. In a like manner the auxiliary ring lead AR is connected to lead 211c which, in turn, is connected through contacts 242a, lead 212c, level G of switch SW87, to lead 155c of the register. The ring lead R of route selector 114 is connected to lead 204c of the ticketer.

Means are provided for outpulsing the information stored in circuit 890 on any convenient basis. For example, in the exemplary system outpulsing is shown on a loop pulsing basis. It should be understood that two-out-of-five pulsing may also be provided. By way of illustration, the digits that are stored in circuit 890 are outpulsed over the digit "8" lead and the digit "4" lead over a circuit that extends from circuit 890 through the digit "8" lead, lead 174c, contacts 886, 828, 809d, lead 155c which connects to the AR lead of route selector 114 in a manner already described. The AT lead of route selector 114 is connected to lead 156c of the register as has been disclosed. Lead 156c connects through contacts 809c, 827, 885 and lead 173c to the digit "4" lead of circuit 890. Thus the outpulsing loop extends from the digit "8" lead and the digit "4" lead of register storage circuit 890 to the auxiliary tip (AT) and ring (AR) leads of route selector 114.

The "end-send" relay 820 and the "dial-end" relay 870 operate (by means not shown) as indicated by their nomenclature, respectively, at the end of sending and at the end of dialing. Note that responsive to the operation of the "end-send" relay, line relay 830 is disconnected from the calling loop by the opening of normally closed contacts 821b and 822b.

The ticketer is now prepared for a cut-through operation.

Cut-through

After the register completes its outpulsing operation route selector 114 and automatic switches 126 seize and signal the called line. However, the register does not have to wait if the switch train is not set promptly because it grounds lead 225c in the ticketer immediately after completion of outpulsing. This ground operates cut-through relay 260 over a circuit that extends from battery on relay 260 through contacts 432 operated to the closed position, lead 225c, level E of SW87, lead 157c to the register, contacts 809a, 824, 871b and 833 to ground.

Responsive to the operation of relay 260, indicator lamp 300 is connected to resistance ground by the operation of contacts 361b and therefore shines with a steady dim light. The energizing circuit includes contacts 321b and resistor R2. Also responsive to the operation of relay 260, contacts 362a open and contacts 362b close, thereby extending ground through contact 332b to contacts 324a which are open at this time, so the extended ground is ineffective at this time. Contacts 363a operate with no effect at this time. Contacts 363b close to extend ground to the "delay alarm" lead 207c. This ground acts to time the transfer of information to the ticketer and to send an alarm if the transfer is not completed on time—all in a manner familiar to those skilled in the art. Relay 220 releases when ground is removed from its locking circuit by the operation of contacts 264a, contacts 462 being open.

To prepare for storage of information in the ticketer, ground is connected to a number of storage relay banks 03, 04, 05, 06, 07, 08, 09 and 10 for locking purposes through lead 254c when contacts 264b close. The manner in which this ground is utilized will become more apparent as this description proceeds.

Relay 240, the auxiliary cut-through relay, is operated by a ground marking extended through its coil to battery when contacts 265 close by the operation of relay 260. A circuit is extended by closing contact 461 from battery on magnet M1 of switch SW1 over lead 259c, contacts 218b, 461, lead 223c, level H switch SW87, lead 154c, contacts 809, 823a and 883 to ground under the control of contacts 883 on "error relay" 880 in the register. Contacts 462 open to break the circuit that extended the original operate ground for relay 220 from the register. Contacts 462 and 463 have no effect at this time. Relay 260 is locked in through contacts 465 over a circuit that extends from ground on the sleeve of the route selector 114 through lead 231c, contacts 443, 465, and the coil of relay 260 to battery. Contact 466 closes to extend locking ground to storage relay banks 19 through 26 (FIG. 6) over a circuit that can be traced from ground through contacts 466, lead 263c, to relay banks 19 through 26. In a similar manner locking ground is extended through contacts 467 and lead 264c to storage relay banks 11 through 18.

Means are provided for cutting the talking conductors through the ticketer. More specifically, contacts 468 close to "cut-through" the incoming selector's ring lead R to the route selector's ring lead R over a circuit that can be traced from the incoming selector's ring lead R through switch SW84, lead 241c, contacts 468, lead 265c, all positions of level D, switch SW1, except 6 and 21, lead 204c to the ring lead R on route selector 114. In a similar manner the tip lead T of incoming selector 109 is "cut-through" to the tip lead T of route selector 114 over a circuit that can be traced from tip lead T of the incoming selector through switch SW84, lead 244c, contacts 469, and lead 245c to tip lead T of the route selector 114.

In carrying out this invention the register is disconnected from the incoming and outgoing switching equipment including incoming selector 109 and route selector 114 and is connected to storage bins in the ticketer. That is, responsive to the operation of 240, the auxiliary cut-through relay, contacts 241a open to disconnect the auxiliary tip lead AT of the outgoing selector from the Register Storage and Storage Read-Out Circuit 890 of FIG. 8. The connection was completed over a circuit previously traced. Contacts 241b close to connect lead 4 of the register storage and storage read-out circuit 890 to the appropriate storage bins or relays of the ticketer over a circuit that extends from digit "4" lead of the register storage and storage read-out device circuit 890, through a circuit that extends over lead 173c, contacts 885, 827, 809c, lead 156c, level F, lead 209c, contacts 241b, lead 210c, the wiper of level J of switch SW1, through the twenty-three positions of the switch as it is operated in synchronism with a read-out switch (not shown, but in box 890) of the register to storage bin or relay banks 03 through 26. Level J therefore supervises the storage and read-out of the "4" digit in a 2-out-of-5 binary code utilized for transferring information to the ticketer in this embodiment of the invention.

Contacts 242a open to disconnect the "auxiliary ring" lead AR of the route selector 114 from the register storage and storage read-out circuit 890 digit "8" lead. The digit "8" lead is connected to the ticketer storage bin or relay banks through level K of switch SW1. In greater detail, the circuit that extends from the AR lead of the route selector 114 through lead 211c, contacts 242a, lead 212c, level G of switch SW87, lead 155c, contacts 809d, 828, 886 and lead 174c to the digit "8" conductor of the register storage and storage read-out circuit 890 is broken when contacts 242a open. A circuit is extended from the digit "8" lead of the register storage and storage read-out circuit 890 through lead 174c, contacts 886, 828, 809d, lead 155c, level G of switch SW87, lead 212c, contacts 242b, lead 213c, and level K of switch SW1 to the ticketer storage bins or relay banks 03 through 25. Contacts 243, 244, 245 and 246a and b operate with no effect at this time.

Contacts 441 close to extend a circuit from digit "2" lead of the register storage and storage read-out circuit 890 to the ticketer storage bins or relay banks. In greater detail, the circuit can be traced from the digit "2" lead of the register storage and storage read-out circuit through lead 172c, contacts 884, 826, 809b, lead 158c, level D of switch SW87, lead 227c, contacts 441, lead 226c and through level H of switch SW1 to the "2" digit relays in the ticketer storage bins. When contacts 442 open the circuit that extended from the digit "2" lead of the register storage and storage read-out circuit 890 to sleeve lead S of the incoming selector is broken. In greater detail, the circuit extended from lead 172c, through contacts 884, 826, 809b, lead 158c, level D, lead 227c, contacts 442, lead 230c, switch SW84, to sleeve lead S of the incoming selector is broken by the operation of contacts 442. Lead 230c is connected through contacts 443 and lead 231c to the sleeve lead S of the route selector 114. Contacts 444, 445 are operated with no immediate effect at this time.

Contacts 446 close to extend the register digit "1" lead from the register storage and storage read-out circuit 890 to the digit "1" relay storage bin or banks of the ticketer over a circuit that can be traced from the digit "1" lead of the register storage and storage read-out circuit, lead 171c, contacts 883, 822a, 805, lead 159c, level C of switch SW87, lead 240c, contacts 446, lead 237c, level G of switch SW1 to the digit storage bins. The operation of contacts 447 opens the connection that existed from lead 240c through contacts 447, lead 241c, switch SW84, to the ring lead R of the incoming selector 109.

Contacts 448 closed to extend a circuit that can be traced from the digit "0" lead storage relays in the register storage read-out circuit 890, lead 170c, contacts 881, 821a, 804, lead 160c, level B of switch SW87, lead 243c, contacts 448, lead 242c, level F of switch SW1 to the "0" storage bins in the ticketer. Contacts 449 open to break the circuit that extended from tip lead T of the incoming selector 109 through preselecting switch MS84, to lead 244c, contacts 449, lead 243, and circuits previously traced to the "0" digit lead in the register.

Briefly, responsive to the cut-through operation leads 242c, 237c, 226c, 211c and 213c are connected to levels F, G, H, J and K respectively of ticketer-sequence switch SW1 and are extended through to the register over circuits which were individually traced. These circuits lead to storage relays in the register in box 890 which are not shown here. From the ticketer standpoint it is only necessary to point out that grounds are delivered through these leads, and through the circuits arready described to the ticketer where they are stored in the storage relays of the ticketer in a manner which will be described.

Hence, in accordance with this aspect of the invention, means are provided for accepting data from the registers. For instance, the register storage tanks that store digits "0," "1," "2," "4" and "8" are connected, responsive to the operation of relay 240, respectively through circuits already traced to levels F, G, H, J and K of a common control means, such as SW1. Also responsive to the operation of relay 240 ground is extended through contacts 444 to lead 232c which is connected to ticketer-access switch SW85 through which the clock calendars are connected to the ticketer. A ground on that lead keeps the absence of ground searching clock calendars from connecting to the ticketer which, at this time, is prepared to receive information from the register.

*Transfer of information from register to ticketer*

Responsive to the cut-through of the ticketer the register proceeds to deliver a maximum of eighteen digits of stored information, consisting of a single digit representing its own number and seventeen digits of calling and called numbers, to the ticketer where these digits are stored in a memory device such as the storage relay banks connected to SW1 contacts 3–20, inclusive, over levels F, G, H, J and K. Twenty-one ground pulses are received by magnet coil M1 of SW1 from the register through lead 223 over circuits previously traced. Simultaneously appropriate 2-out-of-5 codes are delivered to levels F, G, H, J and K of the switch through circuits also previously traced. The register continues to transfer data to the ticketer so long as line relay 830 is operated by the ground on lead 225c. This ground is supplied through lead 230c from the sleeve of the incoming selector.

In greater detail, the ground can be traced to lead 225c through a circuit that is extended from lead 230c through contacts 465 and 432 to lead 225c. The ground on 225c further extends through level E of the ticketer-access switch SW87, lead 157c, contacts 809a, 824, 871a through the coil of line relay 830 to battery, thus reoperating the line relay.

In the absence of this ground, line relay 830 would remain in its unoperated state and, consequently, slow release relay 850 would drop out since contacts 831 would be open and the time lapse would be sufficient for the slow-to-release characteristics of relay 850 to exhaust themselves. Responsive to the return to normal of relay 850, relay 800 which was held to ground through contacts 851 over a circuit previously traced, would also return to normal. Contacts 852, which hold relay 860 operated, would also open releasing that relay and, consequently, end-send relay 820 held operated through contacts 862 would also return to normal, causing contacts 821a, 822a, 826, 827 and 828 all to open, breaking the circuits that extend from the register storage and storage read-out portions of the register to the ticketer.

Responsive to the operation of ticketer-sequence switch SW1 to position 21, under control of ground pulses from the register, relay 210 operates and locks. The operate circuit can be traced from ground through the wiper of level B in position 21 through lead 255c, contacts 245 to battery on the upper coil of relay 210. A locking circuit extends from ground through contacts 215b and 244 to battery on the lower coil of relay 210.

Figure 3:
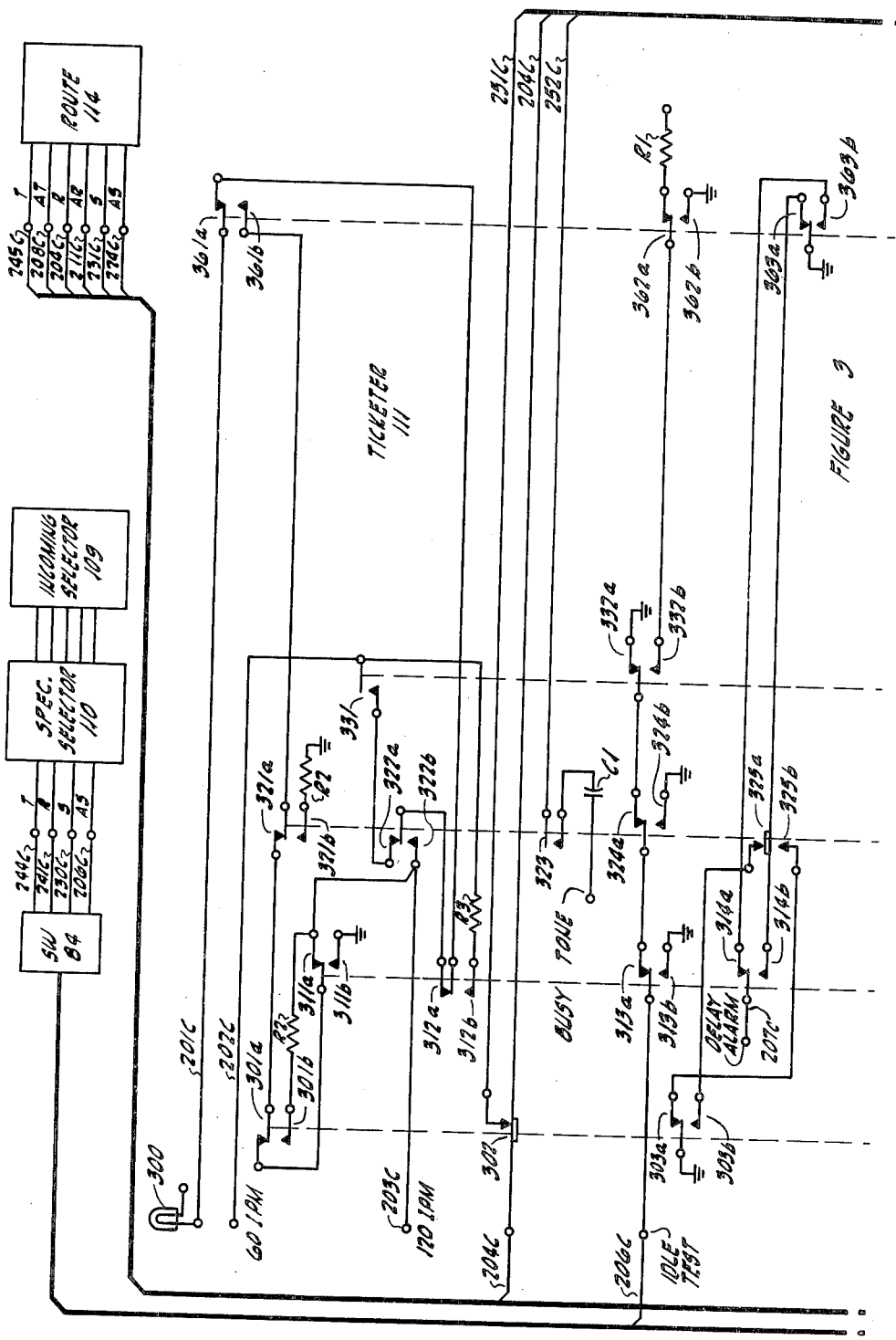
Figure 4:
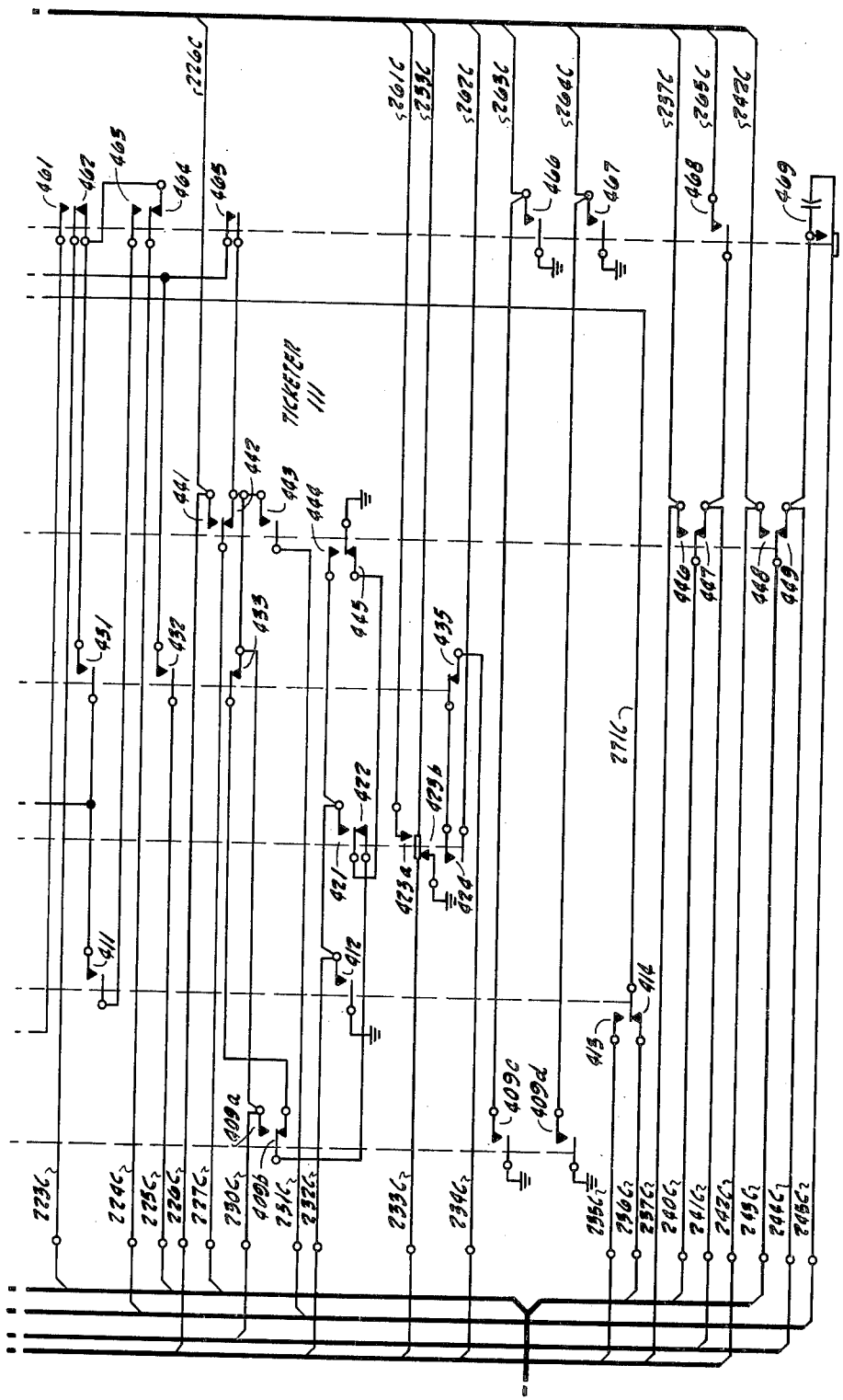
Figure 5:
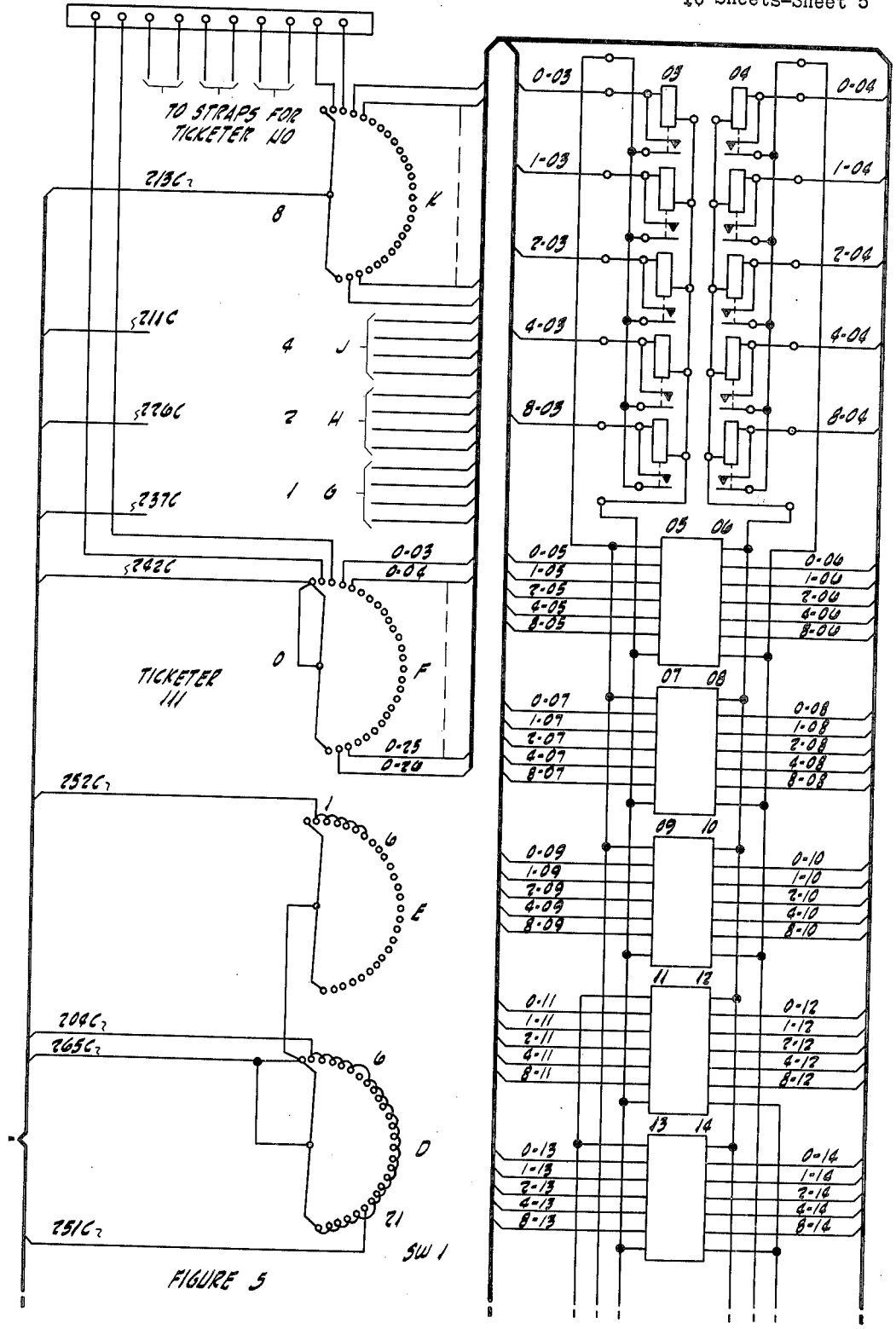
Figure 6:
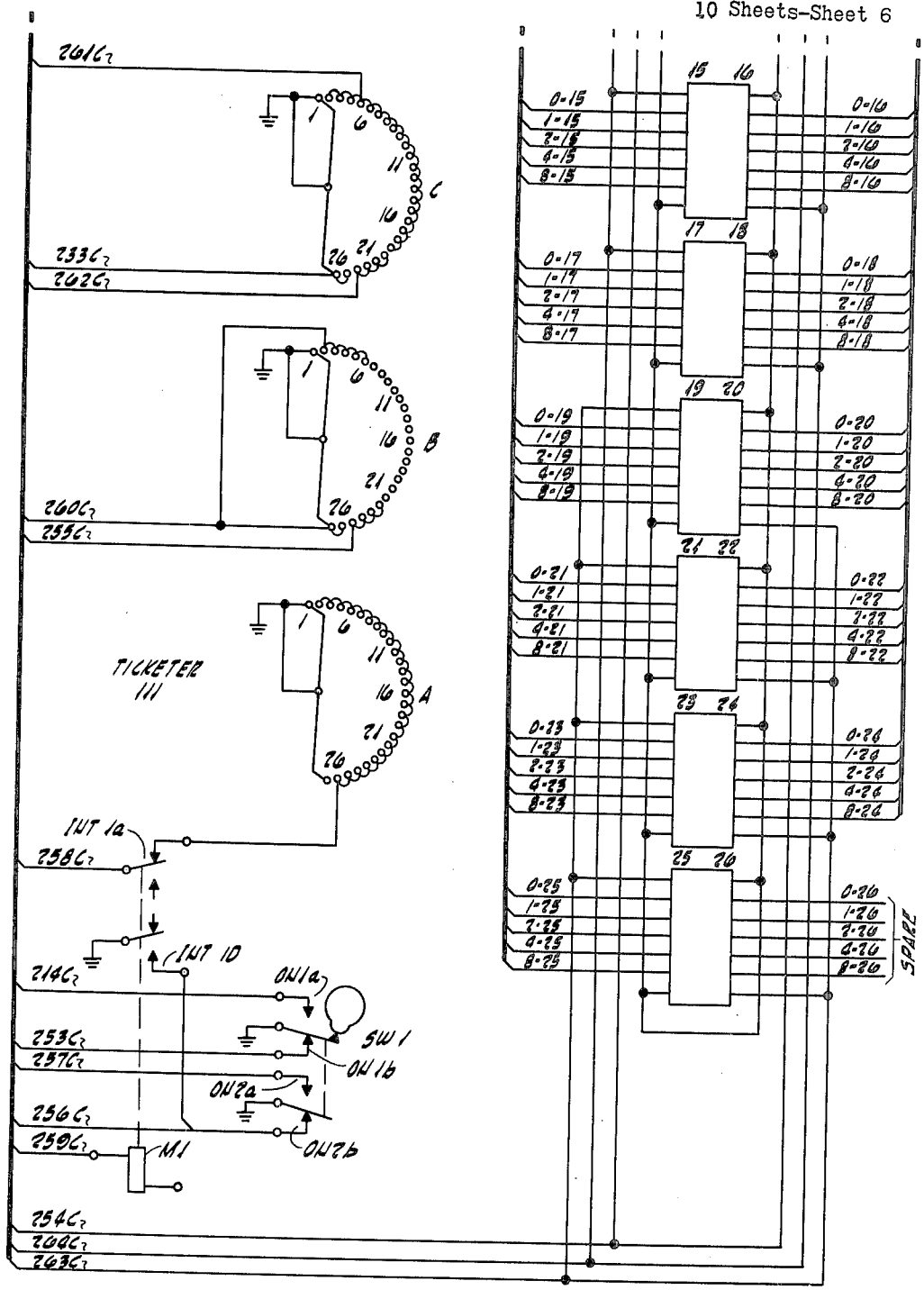
Figure 8:
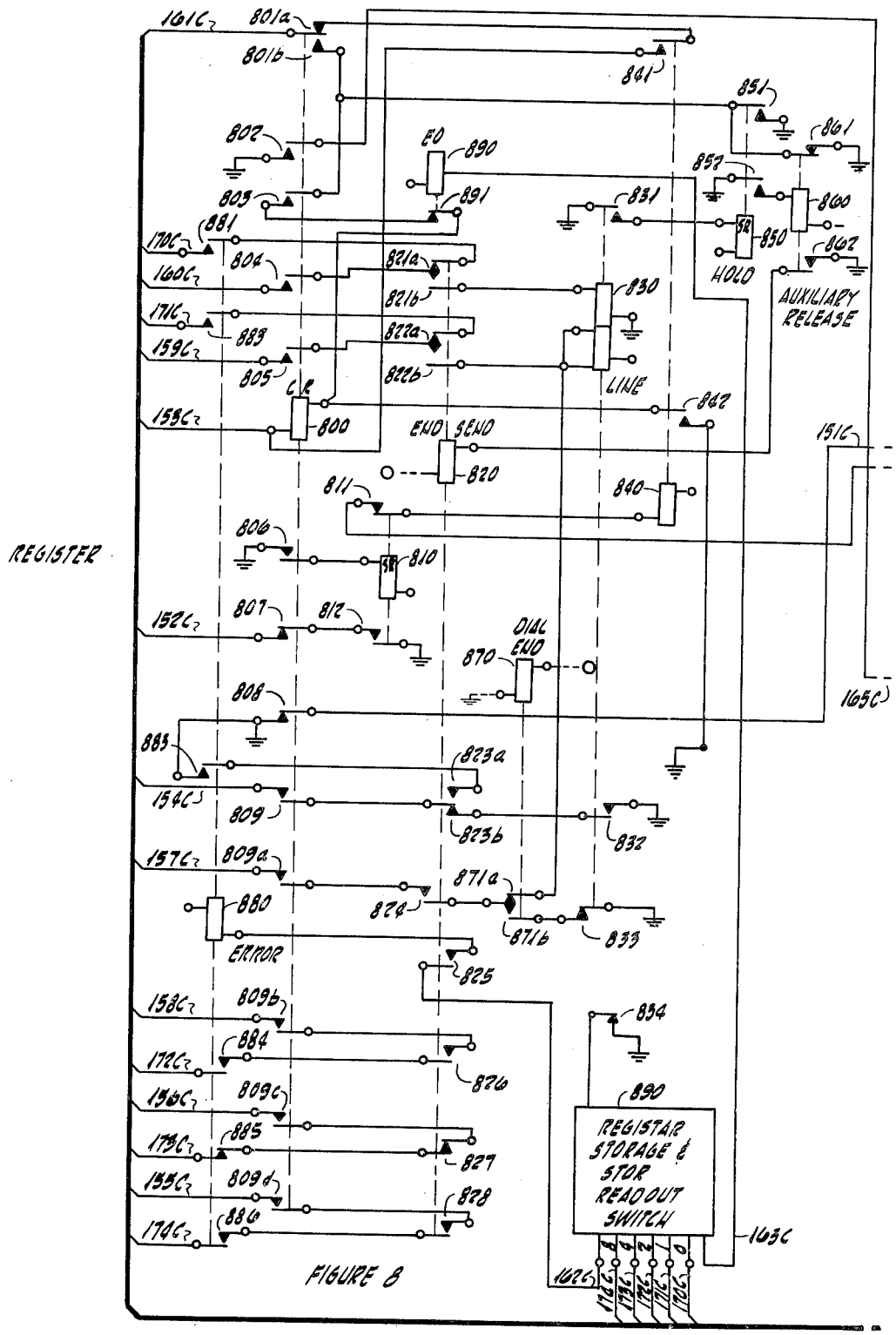
FIG. 8 is a schematic circuit diagram showing only those essential details of the register necessary to make the description of the ticketer used in this particular embodiment of the invention more understandable.

Responsive to the operation of relay 210 contacts 311a open and contacts 311b close, thereby changing the operation of indicator lamp 300 from a 120 i.p.m. flicker to a steady-bright light over a circuit that can be traced from battery through lamp 300, contacts 361b, 321a, 301a and 311b to ground. The steady-bright light indicates that the call is being switched or that the called telephone is ringing. Contacts 312a and 312b operate with no immediate effect. Contacts 313a open and contacts 313b close to extend ground to lead 206c directly through contacts 313b instead of through contacts 362b, 332b, 324a and 313a. Lead 206c is as indicated in FIG. 3 connected to the "idle test" lead of the incoming selector through SW84 and special selector 110. The switch is shown in block diagram form since it could be any of the many types of preselecting switch known to those skilled in the art. Contacts 314a open while contacts 314b close to remove the ground that had previously been extended to the delay alarm lead 207c through contacts 363b and 314a. The removal of the ground indicates the end of the transfer of information from the register to the ticketer. Contacts 215a open without any immediate effect, since only one of the multiple grounds on lead 214c is removed thereby. Contacts 215b provide the self-locking circuit that has been traced previously. Contacts 216a operate to ground lead 220c over an obvious circuit. A ground on lead 220c actuates the magnet of SW87 after relay 800 has returned to normal and thereby prevents another absence-of-ground searching register from connecting itself to this ticketer at this stage of the call. Relay 800 returns to normal when ground is placed on lead 176c by the register storage and storage read-out circuit which occurs after all the information contained therein has been transferred to the ticketer storage bins. Responsive to ground on lead 163c, relay 890 operates, thereby opening contacts 891 and removing ground from the coil of relay 800. Responsive to the removal of ground, relay 800 returns to normal and SW87 steps to disconnect the register from the ticketer. SW87 operates responsive to the ground extending through contacts 812 still operated due to the slow-to-release characteristics of relay 810, contacts 807, lead 152c, and through the magnet coil M87, to battery. Contacts 216a close to ground lead 220c. Contacts 216b open to remove the battery of relay 230 from lead 220c. Relay 230 previously returned to normal when the operation of SW87 removed its operating ground. Contacts 217a operate to a closed position to extend the battery that is on the coil of relay 230 through lead 221c to level C of SW85, the clock calendar access switch. Battery on lead 221 helps to attract a battery-seeking clock calendar. The operation of contacts 218 switch the battery of M1 of SW1 from lead 223 and connect it instead to level B of SW85 through lead 222. In greater detail the circuit that had extended from battery on M1 of SW1 to lead 223 over a circuit utilizing contacts 218b, previously traced, now extends through contacts 218a, lead 222c, to level B of SW85. Contacts 411 close to extend a circuit from the outgoing selector to battery on the coil of relay 220. In greater detail, a circuit can be traced from battery on relay 220, through contacts 411, 463, lead 224c to auxiliary sleeve AS of route selector 114. Contacts 412 close to extend an additional ground to lead 232c over an obvious circuit. This ground is utilized in the clock calendar assigner circuit and its use will be completely described in the following discussion.

Summarizing, means such as relay 210 are provided for causing the indicator lamp to exhibit a steady-bright light, the register and ticketer to disconnect, the ticketer to indicate to the clock calendars that it is available, and prepares a circuit to reoperate relay 220.

The ticketer is now in a busy condition although not associated with the register or a clock calendar. Nothing further happens until either the called party answers the telephone or a busy signal is returned or the calling party hangs up.

*Answer*

Means is provided for detecting answer by the called party. For example, when the called party answers the telephone, ground is extended to operate relay 220 over a circuit that extends from the called party's line circuit over auxiliary sleeve AS through lead 224c, contacts 463, 411 to battery on the lower winding of relay 220.

Responsive to operation of relay 220, a locking circuit is closed that extends from ground through the wiper of level B of the ticketer-sequence switch SW1 on positions 21–24, through lead 255c and contacts 226 to battery on the upper winding of relay 220. This connection prevents release of relay 220 during the registering of connect-time.

A calender-assigner circuit, similar to the circuit used to assign a register, operates when ground is connected to lead 234c and is removed from lead 233c responsive to the operation of relay 220. The ground is extended to lead 234c over a circuit that can be traced from ground on the wiper of level C of ticketer-sequence switch SW1 through the contacts of level C in positions 21–24, lead 262c, contacts 424 and 435 to lead 234c. The ground that was extended to lead 233c through contacts 423b is removed, since contacts 423b are now operated to the open position. Also responsive to the operation of relay 220, the light on lamp 300 changes from steady-bright to steady-dim. The steady-dim light indicates that the called party has answered. Ground is once again extended to the delay alarm lead 207c. A ground circuit also extends from positions 25 and 26 on level B of ticketer-sequence switch SW1 through lead 260c to energize the heater of relay 350, the timing relay which operates after a call has been held for approximately six seconds to operate the billing relay 200.

In greater detail, responsive to the reoperation of relay 220, contacts 321a open to disconnect the circuit previously traced that extended from battery on indicator lamp 300 to ground. Contacts 321b operate to extend a circuit from battery on indicator lamp 300 through contacts 361b, 321b and resistor R2 to ground. The result is that the lamp light changes from a steady-bright glow to a steady-dim glow. Contacts 322a, 322b, 323 and 324a operate with no immediate effect. Contacts 325b close to extend ground to the delay alarm lead over a circuit that extends from ground through contacts 303a, 325b and 314b to delay alarm lead 207c. Contacts 326 operate to lock in relay 220 over a circuit that can be traced from ground through the wiper of level B of switch SW1, positions 21 through 26 of that switch level, lead 255c, contacts 226 and through the upper winding of relay 220 to battery. Contacts 227 open with no immediate effect. Contacts 228 close to extend ground through the wiper of level B of switch SW1, positions 1 through 6, 25 and 26, lead 260c, contacts 228, 208, 237, 218a, lead 222c, to level B on switch SW85. Contacts 421 and 422 operate with no immediate effect. Contacts 423a close to extend ground through the wiper of level C of switch SW1 through positions 1 through 20, lead 261c, contacts 423a, lead 233c to level A of switch SW85. Since ground is connected to lead 233c when switch SW1 is on positions 25 and 26 over an obvious circuit, it follows that lead 233c is ungrounded only when switch SW1 is in positions 21 through 24. Contacts 423b open to remove a direct ground connection from lead 233c. Contacts 424 close to extend ground through the wiper of level C of switch SW1, positions 21 through 24 of that level, lead 262c, contacts 424 and 435, lead 234c, contacts 914 and through the coil of relay 900 to battery operating that relay.

Thus, a clock calendar connects itself to the ticketer in a manner similiar to the connection of the register to the ticketer previously described, also through an access switch indicated in the drawing as switch SW85, i.e. relay 900 is operated over an obvious path responsive to the ground that is on lead 234c. When switch SW1 is operated to positions 21–24, relay 220 is energized and relay 230 is not energized. If there is a ground on lead 233c, then calendar-access switch SW85 is operated to its next position and tests the next ticketer for availability. The circuit wherein this occurs can be traced from lead 233c through the wiper of level A, through contacts 921 and 901 operated to a closed position to battery on magnet coil M85, stepping the switch. If there is no ground on lead 233c, then switch SW85 does not step and the clock calendar is connected to the ticketer. Subsequently, responsive to ground from the clock calendar through switch SW85 to lead 221c, contacts 217, relay 230 reoperates. Five ground pulses are supplied to the ticketer from the clock calendar over lead 222c, and are extended to magnet coil M1 of switch SW1 over a circuit that can be traced from lead 222c, through contacts 218a to lead 259c through the coil to battery. Thus, the switch steps five positions from position 21 through position 25. While the switch is stepping over the five steps, five digits of coded information are delivered to the relay storage banks over leads 242c, 237c, 226c, 211c and 213c. These leads are directly connected to the wipers on levels F, G, H, J and K respectively on ticketer-sequence switch SW1 over circuits that have been previously traced.

Means are provided for indicating to the clock calendars that all ticketers are idle for such functions as changing the clocks from daylight saving time to standard time. This is accomplished by means such as lead 232c which is ungrounded only when the ticketer is idle.

Briefly, responsive to the operation of relay 900, contacts 901 are operated to a closed position, extending a circuit from battery on the coil of the calendar-access switch M85 through contacts 901, 921, to the wiper of level A of switch SW85, which is connected through lead 233c into the ticketer as has already been described. Lead 233c of the ticketer is grounded until operation of relay 220 and thereafter when SW1 is on all positions except 6 and 21. The wiper of level A of switch SW85 is connected to lead 233c which, when grounded, steps switch SW85 because then a circuit from battery to ground through magnet coil M85 is completed. However, when the wiper is connected to lead 233c and ground has already been removed therefrom, then the calendar-access switch SW85 does not step and a calendar is connected to that particular ticketer. Lead 222c of the ticketer is connected to level B of switch SW85 and, in a similar manner, lead 221c is connected to level C, lead 242c is connected to level D, lead 237c is connected to level E, lead 226c is connected to level F, lead 211c is connected to level G and lead 213c is connected to level H of the calendar-access switch SW85.

In greater detail, means are provided for attracting a clock calendar to the ticketer. A ground is extended to operate relay 900. Responsive to the operation of relay 900, contacts 901 close to aid in connecting a clock calendar to a ticketer. Contacts 902 close to extend an operating ground to relay 920 that connects to the battery on magnet coil M85 over an obvious circuit. The current that flows is sufficient to operate relay 920 through its high resistance winding but is insufficient to operate M85. Contacts 903 close to prepare a locking circuit for relay 900.

Responsive to the operation of relay 920, contacts 921 open the operating circuit that extended from the battery on magnet coil M85 to the possible grounds on different positions of the A level of switch SW85 to which leads 233c of the ticketers are connected. Contacts 922 close to partially prepare an operating path to magnet coil M9 of switch SW9. Contacts 923 close to prepare a locking path for relay 910. Contacts 924 close to complete the operating circuit of relay 930 from battery on relay 930, through contacts 924, 915, INT9b to ground. Contacts 925 close to partially prepare a circuit that, when completed, will transmit ground pulses through level B of switch SW85 to magnet coil M1 of the ticketer to synchronize the steps of switch SW9 and switch SW1. Contacts 926 close to complete an operating circuit for relay 230 that can be traced from battery on relay 230 through contacts 217, lead 221c, level C of switch SW85 and contacts 926 to ground. Thus, it is shown that among other things responsive to the operation of relay 920, relays 930 and 230 operate.

Responsive to the operation of relay 930, contacts 931 close to complete an operating circuit to magnet coil M9 that can be traced from battery on magnet coil M9 through contacts 922 and 931 to ground. Operation of magnet coil M9 steps switch SW9. Contacts 932 close to complete the operating circuit that extends to magnet coil M1 to operate switch SW1 over a circuit that can be traced from battery on M1 through lead 259c, contacts 218a, lead 222c, level B of switch SW85, contacts 925 and 932 to ground. Contacts 933 close to extend the digit "0" lead of the clock calendar and read-out circuit 950 to the ticketer storage banks over a circuit that can be traced from the digit "0" lead through contacts 933, level D of switch SW85, lead 242c, level F of switch SW1 to the digit "0" relays in the ticketer storage banks. In a similar manner, contacts 934 close to connect the digit "1" lead of the clock calendar and read-out circuit 950 through level E of switch SW85, lead 237c, level G of switch SW1 to the digit "1" relays in the ticketer storage banks. Contacts 935 close to connect the digit "2" lead of the clock calendar and read-out circuit 950 through level F of switch SW85, lead 226c, level H of switch SW1 to the digit "2" relays in the ticketer storage banks. Contacts 936 close to connect the digit "4" lead of the clock calendar and read-out circuit 950 through level G of switch SW85, lead 211c, level J of switch SW1 to the digit "4" relays in the ticketer storage banks. Contacts 937 close to connect the digit "8" lead of the clock calendar and read-out circuit 950 through level H of switch SW85, lead 213c to level K of switch SW1 to the digit "8" relays in the ticketer storage banks.

Summarizing, the operation of relay 930 energizes coil M9 of switch SW9, connects an operating ground under the control of relays 930 and 920 to magnet coil M1 of switch SW1 and connects the digit "0," "1," "2," "4" and "8" leads of the clock calendar and read-out circuit 950 to the digit "0," "1," "2," "4" and "8" relays in the ticketer storage banks to transfer time, date and rate information to the ticketers.

Responsive to the energization of magnet coil M9, switch SW9 steps towards position 1. Responsive to this stepping operation, interrupter contacts INT9c close with no immediate effect; contacts INT9b open and remove the operating ground on relay 930. The release of relay 930 removes the operating grounds on magnet coils M1 and M9 through contacts 932 and 931 respectively. Responsive to the de-energization of magnet coils M1 and M9, switches SW85 and SW1 step to the next positions, which are positions 1 and 21, respectively. When switch SW85 is in position 1, interrupter contacts INT9b close to reoperate relay 930 which, in turn, causes the reenergization of magnet coils M1 and M9 and re-connects the digits "0," "1," "2," "4" and "8" of the clock calendar and read-out circuit 950 to the ticketer relay storage banks. Information is transferred, using the 2-out-of-5 code, from the clock calendar to the ticketer and the cycle repeats. When switch SW9 is in its position 5, an operating ground is extended to relay 910 over a circuit that can be traced from battery on relay 910 through position 5 of switch SW9, the wiper of switch SW9, contacts INT9c to ground.

Responsive to the operation of relay 910, contacts 911 close to extend ground to maintain magnet coil M85 magnetized. Quick-to-close contacts 912 close the self-locking circuit of relay 910. Contacts 913 open the locking circuit of relay 900. Contacts 914 open to prevent the operation of relay 900 by any grounds over lead 234c.

In brief, responsive to the operation of relay 910, the clock calendar and its auxiliary circuits are released.

During the stepping of switch SW9, 2-out-of-5 coded information is transferred over leads 242c, 237c, 226c, 211c and 213c. For example, if the time is 11:23, and the rate code is 5, the following digits would be transmitted: on step 1 a ground would be extended through leads 242c and 237c; on step 2 a ground would be extended through leads 242c and 237c; on step 3 ground pulse would be extended through leads 242c and 226c; on step 4 ground pulses would be extended through leads 226c and 237c; on step 5 ground pulses would be extended through leads 211c and 237c. At this time the clock calendar disconnects from this ticketer.

Responsive to the operation of the ticketer-sequence switch to its 25th position, the locking circuit of relay 220 is opened, which had previously been completed from ground through the wiper of level B of switch SW1 through positions 21 to 25, to lead 255c, through contacts 226 to battery on the coil of relay 220. However, the wiper of level B is no longer on positions 21–25, therefore, ground is no longer extended through lead 255c. Hence, relay 220 is now operated over the ground that extends back from the outgoing selector to lead 224c. Thus, at this time relay 220 is under the control of the line circuit of the called party and relay 220 remains operated after its locking circuit opens, as previously described, only if the call has been answered. When the call is answered the following conditions prevail: relays 220, 210 are operated; relays 200, 230 and 250 are unoperated; ticketer-sequence switch magnet M1 is energized over a circuit that can be traced from ground through the wiper of level B of ticketer-sequence switch SW1, through contacts on position 25 of level B, lead 260c, contacts 228, 208, 237, 218a and through lead 259c to battery on coil M1.

Timing means are provided for monitoring the talking loop to ascertain that the connection has been completed for a certain minimum amount of time, i.e. timer relay 250 is energized from battery on the heater of timer relay 250 through contacts 207b, 246a, 236 to lead 259c which is grounded over the circuit previously traced. After a fixed time period (in this embodiment of the invention, approximately six seconds) the thermal sensitive contacts of time relay 250 close and responsive thereto billing control means such as the slow to release billing relay 200 is operated over a circuit that can be traced from ground through contacts 251 to the battery on the coil of relay 200.

Responsive to the operation of billing relay 200 contacts 301a and 301b operate with no effect at this time. Contacts 302 open to disconnect lead 251c from lead 204c. Lead 204c is, as has been previously disclosed, connected to the ring lead R of route selector 114. Lead 251c connects to position 21 on level D of switch SW1.

All other positions of that switch except position 6 are connected to lead 204c. The wiper of the D level of switch SW1 is connected to lead 265c which, as has previously been shown, is connected to the ring lead of the incoming selector 109 through contacts 468 and lead 241c. Contacts 303a open to remove ground that extended through contacts 303a, 325b, 314b to lead 207c, the delay alarm lead. Contacts 303b close with no immediate effect. Contacts 204 close and connect another operating path for relay 210 that extends from battery on the coil of relay 210, through contacts 204, 215b to ground. Contacts 205 close to connect another ground to lead 254c. As has been explained previously, ground on lead 254c is used as a locking ground for the relay storage bank. Contacts 206 close to extend a locking path for relay 200 that extends from battery on that relay through contacts 206, lead 257c, through off-normal contacts 2a to ground. Contacts 207a close with no immediate effect. Contacts 207b open to remove the grounding circuit which caused the operation of thermal relay 250 over a circuit previously traced. Contacts 208 open to break an operating circuit that previously extended to magnet coil M1 from ground on level B of switch SW1.

In greater detail, the circuit that extended from ground through the wiper of level B to positions 1 through 6 and 25 and 26, lead 260c, contacts 228, 208, 237, 218a, lead 259c and coil M1 to battery is now open. The same ground that comes through the wiper of level B also extended to lead 222c, which is connected to lead 259c through contacts 218a in the previously traced circuit. Contacts 409a and 409b operate with no immediate effect. Contacts 409c close to extend ground through lead 263c to the relay storage banks to be used for locking purposes on relay banks numbers 19, 20, 21, 22, 23, 24, 25 and 26. In a similar manner, contacts 409d close to extend ground through lead 264c to the relay storage banks where the ground is utilized for the locking purposes on relay storage banks 3, 4, 5, 6, 7, 8, 9 and 10.

Summarizing, responsive to the operation of billing relay 200, ground is removed from the heater of timer relay 250; lead 259c is disconnected from lead 260c when contacts 308 are operated to an open position; and this removal of the ground transmitted by lead 260c from the coil M1 of switch SW1 causes switch SW1 to step to position 26, its normal position. Ground is removed from the alarm lead 207c. Removal of ground at this time from the alarm lead indicates receipt of connect time from the clock calender and passage of the grace period after answer. Also, relay 200 locks itself in over its own make contacts. Relay 200 also performs functions which are ineffective at this time. The ticketer is now in talking condition on a call that will be billed. Nothing further occurs until the call is released.

*Flash*

If, however, instead of receiving ground over lead 224c, flashes of 30, 60 or 120 i.p.m. are received over lead 224c, the call cannot be completed because of either a no-circuit condition, a line-busy or a re-order condition. The pulsing operation of relay 220, responsive to the flashing signal from a distant office or called party, will step the sequence switch SW1 from its normal position to position 6 over a circuit that can be traced from ground through the wiper of level B through positions 25, 26, 1, 2, 3, 4, 5 and 6, through lead 260c, contacts 228, 208, 237, 218a and lead 259c to the battery on coil M1 of switch SW1. Therefore, responsive to the flashing of relay 220, when contacts 228 pulse to a closed and open position, switch SW1 steps through positions 25, 26, 1, 2, 3, 4, 5 and 6. It should be noted that during this stepping the timer relay 250 is operated intermittently over a circuit previously traced from battery on the heater of relay 250 through contacts 207b, 246a, 236 to lead 259c and ground thereon. However, the intermittent energization of the heater coil does not generate sufficient heat to cause the contacts of relay 250 to close. Also, responsive to the flashing of relay 220, the called line loop opens to release the connection when ticketer-sequence switch SW1 reaches position 6.

In greater detail, the circuit connecting incoming selector ring lead 241c to the outgoing selector ring lead, renders lead 204c discontinuous. Previously the circuit was completed through contacts 468, through lead 265c and through the wiper of level D of sequence switch SW1, on any position except 6 and 21, to lead 204c. The ticketer-sequence switch SW1 is now in position 6, therefore, the circuit is no longer complete.

Also responsive to the flashing signal, indicator lamp 300 changes from steady-bright to an intermittent-dim under the control of relay 220, as it is being pulsed, over a circuit that can be traced from battery on indicator lamp 300, through contacts 361b, 321b or 321a, depending upon the relative position of relay 220. If contacts 321b are operated to a closed position, the lamp receives ground through resistor R1 and is dim. If contacts 321a are in a closed position, the circuit is extended through contacts 301a and 311b to ground and indicator lamp 300 is bright. Therefore, the lamp is alternately bright or dim at the flashing rate. In addition, responsive to the flashing of relay 220, the delay alarm lead 207c is periodically grounded and ungrounded over a circuit that extends from ground through contacts 303a, 325b and 314b to lead 207c. As relay 220 is alternately operated and released, contacts 325b alternately open and close, thereby alternately grounding lead 207c. Another function of the flashing signal is to provide means for generating a busy signal. This is accomplished by delivering an interrupted dial tone to the calling subscriber over a circuit that may be traced from dial tone source through lead 205c, contacts 323 (alternately opened and closed responsive to the operation and release of relay 220), through lead 252c to positions 1 through 6 on level E of the ticketer-sequence switch SW1, through the wiper of level E to lead 265c through lead 265c, contacts 468 to lead 241c, the ring lead of the incoming selector, and connects to the ring lead in the line circuit of the calling subscriber. The busy signal notifies the calling subscriber to release the connection.

*Release*

When the calling subscriber replaces his handset, the loop is broken and a bridge relay (not shown) but in the switch train connected via route selector 114 releases. Thereafter relay 260 releases, since ground is no longer extended from the route selector sleeve, lead 231c, contacts 443 and 465 to battery on relay 260. Responsive to the release of relay 260, its slave relay 240 also releases when ground is removed from the coil of 240 by the opening of contacts 265. Responsive to the release of relay 240, relay 210 releases when the ground which extended to the battery on the lower winding of relay 210 from ground through contacts 215b and contacts 244 no longer extends through contacts 244 which have returned to their normally open position. Relay 220 releases when the ground that had previously been extended from lead 224c through contacts 463 and 411 to battery on the lower winding of relay 220 can no longer reach the coil of relay 220, because contacts 463 and 411 are in their normally open position. Likewise, the storage relays release when grounds are removed from leads 263c, 264c and 254c upon the release of relay 260 and the consequent restoration of the normally open contacts 264b, 467 and 466.

Means are provided to restore the ticketer-sequence switch SW1 to its normal position. A circuit extends from ground through the wiper of level A, through positions 1 through 25 of level A, through interrupter contacts INT2a, lead 258c, contacts 246b and 236, lead 259c to battery on coil M1. The switch stops operating when it reaches position 26 because position 26 is not connected on level A of the switch. The ticketer at this time is released (idle) and not associated with a register.

*Release by called party on a billable call*

When the called party replaces his handset on the hookswitch at any time after the operation of relays 250 and 200, the call will be billed. The operation of the hookswitch will release relay 220 and will cause switch SW1 to step twenty positions to position 20 at the rate of one step per second. Responsive to switch SW1 being in position 20, the line loop will open and relay 260 and, consequently, relay 240, will release. While switch SW1 is stepping to position 20, indicator lamp 300 will show a 120 i.p.m. dim flash. Responsive to the release of relay 240, switch SW1 returns to normal, causes indicator lamp 300 to flash dimly at a 60 i.p.m. rate and calls for a printer or perforator. Responsive to the connection of the ticketer to the printer or perforator, relay 230 reoperates. Responsive to the reoperation of relay 230, the locking circuit on relay 200 is opened. However, relay 200 is maintained in its operated condition through its operate circuit. The control of switch SW1 is transferred to the printer or perforator assigner circuit of FIG. 10. The printer or perforator assigner causes switch SW1 to step through all its positions. While so doing it transfers all of the stored information to the printer or perforator. When switch SW1 returns to normal, the ticketer is released and is once again available to searching registers, but unavailable to searching selectors.

In greater detail, when the called party returns the handset to the hookswitch, ground is removed from the AS lead of route selector 114. This ground had been operating relay 220 over a circuit that did extend from battery on the lower winding of relay 220, contacts 411, 463 and lead 224c to ground on the AS lead; therefore, the return of the handset to the hookswitch causes relay 220 to return to its unoperated condition.

Responsive to the release of relay 220, contacts close a circuit that extends from battery on indicator lamp 300 through lead 201c, contacts 361b, 321a, 301b, resistor R2, lead 203c to the 120 i.p.m. source and cause the indicator lamp to flash dimly at a 120 i.p.m. rate. Contacts 321b open to remove the resistance ground that caused indicator lamp 300 to emit a steady-dim light. Contacts 322a and 322b operate with no immediate effect. Contacts 323 open the dial tone circuit that was previously traced. Contacts 324a, 324b, 325a, 325b and 226 operate with no immediate effect. Contacts 227 close to extend a timed pulse from its source to operate magnet coil M1 of switch SW1 over a circuit that can be traced from the timed pulse source through contacts 227, 207a, 246a, 236, lead 259c through coil M1 to battery. The time pulse causes switch SW1 to step at the rate of twenty impulses per minute to its normal position. Contacts 228, 421, 422 and 423a operate with no immediate effect. Contacts 423b close placing ground once again on lead 233c. Contacts 424 open with no immediate effect.

Responsive to the operation of switch SW1 to its normal position, relays 260 and 240 return to their normally operated position. In greater detail, the operate circuit for relay 260 is opened when switch SW1 operates to its normal position, thereby opening the line loop and disconnecting the ring lead R of incoming selector 109 from ring lead R or route selector 114, which leads were connected as previously traced and disclosed on level D of switch SW1 in every position but position 6 and the normal position of switch SW1. Responsive to the release of relay 260, contacts 361a close to extend a circuit from the 60 i.p.m. source through lead 202c, resistor R3, contacts 312b, contacts 361a, lead 201c to the indicator lamp 300. The indicator lamp now emits a dim light, flashing at 60 i.p.m. Contacts 361b open the previous circuit to indicator lamp 300. Contacts 363a close to place ground on delay alarm lead 207c through contacts 314b, 363a to ground. This ground is in addition to the ground applied to the delay alarm through contacts 303b. Contacts 362a and b, 363b and 264a operate with no effect. Contacts 264b open to remove a second ground from lead 254c which was a holding ground for the relay storage banks. Therefore, after relay 260 releases, the only ground remaining on lead 254c is that applied through contacts 205. Contacts 265 open to release relay 240. Contacts 461–464 have no effect at this time. Contacts 466 and 467 open to remove ground from leads 263c and 264c, thereby removing a holding grounds for the relay storage banks. After the release of contacts 466 and 467, the only holding grounds on leads 263c and 264c are those applied through 409a and 409b respectively. Contacts 468 and 469 open to break the loop connection, i.e. to open the connection between the ring lead of incoming selector 109 and route selector 114 and the tip leads of the incoming and route selectors respectively on circuits that have previously been traced.

Responsive to the release of relay 240, contacts 241, 242, 243, 244 and 447 have no immediate effect. Contacts 244 open to remove the operating ground from relay 210; however, it remains operated over a circuit traced from battery on its lower coil, through contacts 204, 215b to ground. Contacts 246a open to disconnect the timed pulse source from coil M1. Contacts 246b close to connect lead 258c through to lead 259c. It will be recalled that lead 258c is connected to interrupter contacts INT2a and lead 259c is connected to coil M1, thus providing a homing circuit for switch SW1. Contacts 443 open to break the sleeve loop, i.e. the connection between the sleeve of incoming selector 109 and the sleeve of route selector 114. Contacts 445 close to extend ground to the sleeve of incoming selector 109. The remainder of the relay 240 contacts have no effect.

Means, such as the absence of ground on lead 214c and a ground on lead 235c, is provided to attract a printer or perforator by causing switch SW86 to interconnect an idle printer or perforator and the ticketer. In greater detail, a ground on lead 235c causes relay 1010 to operate. The ground is extended to relay 1010 over a circuit from ground through off-normal contacts ON1b of switch SW1, in the normal position, to lead 253c, contacts 233a, 243a, 413, lead 235c to battery on the coil of relay 1010. Responsive to the operation of relay 1010, contacts 1011 close to extend a circuit from lead 214c through level H of switch SW86, contacts 1008, 1011, interrupter contacts INT86 to the battery on coil M86. If lead 214c is grounded, as is the case when the ticketer is idle, coil M86 is energized to cause the switch to step. When coil M86 is energized, interrupter contacts INT86 open to break the circuit thus causing the switch to step until an ungrounded lead 214c is located, which indicates a busy ticketer with no printer or perforator attached. Also responsive to the operation of relay 1010, contacts 1012 operate to extend the upper coil to a holding ground in the printer or perforator 117. The details of this circuit 117 are not shown, since they may be similar to the many printer or perforator control circuits already in use in toll ticketing systems. Contacts 1013 extend an operating ground through the coil of relay 1000, interrupter contacts INT86, and the coil M86 to battery. Sufficient current flows through this circuit to operate relay 1000, but the current through coil M86 is insufficient to operate the magnet due to the high resistance winding of relay 1000.

Each storage bin or bank of the ticketer is made up of five relays, a digit "0" relay, a digit "1" relay, a digit "2" relay, a digit "4" relay and a digit "8" relay. The storage banks are numbered 03 through 26. The 26th bank is a spare in this particular embodiment of the invention. Levels F, G, H, J and K of switch SW1 read information in and out of the storage banks. Level F is connected to the "0" digit relays; G is connected to the digit "1" relays, H is connected to the digit "2" relays, J is connected to the digit "4" relays and K is connected to the digit "8" relays. In other words, each terminal or position of level F is wired to an individually associated relay in the "0" storage bins numbered from 03 through 26. Thus, position 4 of level F is connected to the digit "0" relay of 03 storage bank; position 5 is connected to the digit "0" relay of the 04 storage bank. In a similar manner, the other levels and positions of switch SW1 are connected to the other relay storage banks.

In carrying out the invention, switch SW1 is common control means which is driven first to distribute data to the storage bin and second to read-out the data. For example, if, during read-in, the wiper of level F is marked on the fourth step, the "0" digit relay of the 03 bin is operated and locked to holding ground on lead 254c. Thereafter, during read-out, switch SW1 is reoperated and on the fourth step the holding ground applied through contacts on the "0" digit relay of the 03 bin is transmitted through the wiper of level F to the printer or perforator 117.

More specifically, responsive to the operation of relay 1000, contacts 1001 close to extend a circuit that can be traced from digit "8" lead of the printer or perforator 117 through contacts 1001, level A of switch SW86, lead 213c to level K of switch SW1 and the "8" digit relays.

Contacts 1002 close to extend a circuit from the digit "4" lead of the printer or perforator 117, level B of switch SW86 to lead 211c, level J of switch SW1 and the digit "4" relays of the storage bins or banks, all in the manner described for level F. Contacts 1003 close to extend a circuit from the digit "2" lead of the printer or perforator through contacts 1003, level C of switch SW86, lead 226c, level H of switch SW1, to the digit "2" relays of the storage bins or banks. Contacts 1004 extend a circuit from the digit "1" lead of the printer or perforator through level D, lead 237c, and level G of switch SW1, to the digit "1" relays of the storage bins or banks. Contacts 1005 close to extend a circuit from the digit "0" lead, level E of switch SW86, lead 242c, to level F of switch SW1, to the digit "0" relays of the storage bins or banks in the ticketer. Contacts 1006a operate to remove a ground that extends into the printer or perforator to allow a switch in the printer or perforator control circuit to by synchronized with switch SW1 in the ticketer. Also contacts 1006b close to extend a ground through level F of switch SW86, lead 221c, contacts 217a to battery on the coil of relay 230 which operates. Contacts 1007 close to connect the operating magnet of a switch in the printer or perforator (not shown) to coil M1 of switch SW1 though level G of switch SW86, lead 222c, contacts 218a, lead 259c to battery on coil M1. This connection synchronizes the movement of switch SW1 and the switch (not shown) in printer or perforator control circuit 117. Thus, the storage bins or banks in the ticketer are read-out by switch SW1 and the information stored therein is transferred to operate the printer or perforator and make a permanent record of the toll call. Contacts 1008 open to prevent the magnet M86 from further operating switch SW86, while the information is being transferred from the ticketer to the printer or perforator.

When relay 230 reoperates, contacts 233a open to disconnect lead 253c from lead 235c, thereby removing the ground from lead 235c that was previously transmitted to operate relay 1010 and attract the perforator or printer 117. Contacts 233b close, connecting the grounded lead 253c to lead 214c and level H of switch SW86. Contacts 235 open to remove the holding ground from relay 200, which ground previously extended through off-normal contacts ON2b, lead 256c, contacts 235 and 206 to the battery on the coil of relay 200. Relay 200 is a slow-to-release relay and, therefore, does not release immediately. Contacts 236 open a circuit previously extended from level A of switch SW1, so that switch SW1 is controlled from the printer or perforator 117 over lead 222c, contacts 218a. The remaining contacts of relay 230 have no effect at this time.

Switch SW1 is driven responsive to pulses from the printer or perforator via lead 222c, contacts 218a, lead 259c to the battery on coil M1, switch SW1. Switch SW1 steps in synchronism with the switch in the printer or perforator and releases 25 bits of information that actuate the printer to make a permanent record of the toll call data.

Means is provided for printing the ticketer number, for example, on positions 1 and 2 of switch SW1, due to terminal strapping in the ticketer. Thus, the identity of faulty ticketers may be ascertained.

Means is provided for informing circuit 117 that all ticketers are idle to turn off the perforator motor. This is accomplished herein by markings applied to lead 232c, as when contacts 444 close on cut-through. When switch SW1 returns to its normal position, the holding ground for relay 200 is disconnected as off-normal contacts ON2a open. After a time lapse, necessitated by the slow-release characteristics of relay 200, that relay returns to its normally unoperated condition. Responsive to release of relay 200, contacts 303b open to remove ground from the delay alarm lead 207c. Contacts 204 open to remove the holding ground from relay 210, previously extended from ground through contacts 215b. Contacts 205 open to remove ground from lead 254c, which was a holding ground for storage relay banks 03–10, which now release. Contacts 207a, 207b, 208 and 409b operate with no immediate effect. Contacts 409a open to unground lead 230c. The ground circuit had extended through a circuit that can be traced from ground through contacts 445, 422b, 409a to lead 230c, switch SW84 and special selector 110 to the sleeve lead S of incoming selector 109, thus releasing the calling switch train. Contacts 409c open to remove the ground on lead 263c that held relay storage banks 19 through 26, which release. Contacts 409d open to release relay banks 11 through 18. Among other things, therefore, the release of relay 200 causes the storage bins or relay banks to return to normal and relay 210 to return to normal.

When relay 210 releases, contacts 312a close to extend a circuit from 60 i.p.m. source through lead 202c, contacts 331, 322a, 312a, 361a, lead 201c and through indicator lamp 300 to battery. Therefore, indicator lamp 300 now radiates brightly and flashes at a 60 i.p.m. rate. Contacts 312b open to remove the resistance R3 from the circuit to the indicator lamp. Contacts 313b open to remove the ground from the idle test lead 206c that previously extended through to lead 206c to mark incoming selector 109 idle. Contacts 314b open to remove a ground from the delay alarm lead 207c. Contacts 215a close to ground lead 214c, which indicates to the printer or perforators that this ticketer is not available, i.e. a printer or perforator would not seize an idle ticketer with no stored information. Contacts 217 open to remove ground from relay 230 which releases. Contacts 218a open, disconnecting the coil of M1 from the printer or perforator. The remainder of the contacts on relay 210 have no effect at this time. It should be noted that the receipt of time information at the end of the call is not under the control of the ticketer. More particularly, as shown in FIG. 1, the printer or perforator 117 is connected to the clock calendar via a common end-of-call (EOC) bus. The clock calendar continuously applies periodic time signals to the bus. Thus, after the printer or perforator has completed its function, it automatically picks up the next time signal appearing on bus EOC, which signal is printed as the disconnect time.

Retrogressing for a moment to fill in the details of the connection and disconnection of the printer or perforator 117, after the printer and perforator are connected to the ticketer, relay 230 is operated by a ground from the printer or perforator assigner circuit of FIG. 10. The printer or perforator receives the infomation from the ticketer while a switch (not shown) in the ticketer or perforator 117 is stepping in synchronism with switch SW1. When switch SW1 reaches its normal position, ground is placed on lead 253c through the off-normal ON1b contacts. At the same time, a locking ground (not shown) is removed from relay 1010 by circuit 117 previously extended through contacts 1012 to battery on the left-hand coil of relay 1010. Since there is no ground on lead 235c because contacts 413 are open, relay 1010 releases. Contacts 1013 open to release relay 1000. Responsive to the return to normal of relay 1000, contacts 1001 through 1005 open to disconnect the printer or perforator digits "0," "1," "2," "4" and "8" leads from the storage bins or relay banks in the ticketer. Contacts 1006b open, removing the operating ground from relay 230 in the ticketer. Contacts 1007 open to disconnect the magnet coil M1 of switch SW1 from the magnet coil of a switch in the printer or perforator (not shown). Contacts 1008 close to once again place the printer or perforator in an idle condition. According to this invention, the printer or perforator 117 is not automatically stepped away from the ticketer on disconnect, but is disconnected due to the release of relay 1000.

Responsive to the release of relay 230, contacts 331 open and indicator lamp 300 is dark. Contacts 332a close, once again extending ground over conductor 206c to the idle test lead of the selector 110. Contacts 332b open to remove the busy indicating resistance battery from the idle test lead 206c that extended from battery through resistance R1. Contacts 233a close to connect lead 253c, which is grounded through off-normal contacts ON1b on switch SW1 to lead 236c over a circuit from lead 253c through contacts 233a, 243a, 414 to lead 236c to mark the ticketer 111 circuit as idle. Contacts 236 close to connect ground from the wiper of level A through the contacts of that level, interrupter contacts INT1a, lead 258c, contacts 246b, 236, to lead 259c and the battery on coil M1 of switch SW1. This causes the switch to step home, if not already in its normal position, where the wiper on level A stands on an ungrounded terminal.

The ticketer is now idle, not associated with a register, and available to seizure by the register. It may be in this condition for any indefinite length of time. The following characteristics are indicative of the ticketer in this condition: there is battery on lead 220c, ground is extended through lead 206c (the idle test lead), ground is also extended to lead 230c which is connected to the sleeve of the incoming selector. Ground is also extended to lead 236c to permit the register to search for ticketers. Grounds are also connected to leads 214c and 233c to prevent seizure of the ticketers at this time by any searching calendar, printer or perforator.

*Release by calling party on a billed call*

The essential difference between the release by a calling party and the release by a called party on a billed call is that the release by the called party immediately drops relay 220 which causes the timed pulse lead to be connected at contacts 227 to coil M1 of switch SW1, as has just been disclosed. When the calling party hangs up first, which is the normal procedure, grounds are removed from sleeve leads 230c and 231c in a well known manner. Responsive to the removal of grounds from leads 230c and 231c, relay 260 and relay 240 release. Responsive to the release of relay 260, relay 220 releases when its grounding circuit is broken at contacts 463. In all other respects the operation of the ticketer is the same when released by either the calling party or the called party.

*Conclusion*

While those skilled in the art will readily recognize many advantages inherent in the subject invention, it may be helpful to point out a few of the most pertinent. First, a toll ticketer is part of an electrical "brain" which receives, stores, and records basic data. The subject invention is characterized by incorporation of the "brains" of the system in common equipment (i.e. registers, clock calendars, etc.) which is shared by all of the ticketers. The ticketer, per se, which is held for the duration of a call, has very little of the system "brains." Consequently, only six telephone type relays (200–240 and 260), a single ten-level switch (SW1), and data storage bins 03–26 are tied up during any given call.

A second advantage is that the time during which expensive switching equipment is setting up a call may be traded for time after the call is established and sometimes even after a call is answered. For example, the steps in a toll call are as follows:

(1) The calling subscriber lifts a handset.
(2) A toll access code (such as 112) is dialed.
(3) A ticketer-register combination is seized.
(4) The terminal number is dialed.
(5) The register stores all data necessary to set-up the call.
(6) The register outpulses to set the switching equipment.
(7) The ticketer cuts through.
(8) The register delivers data to the ticketer.
(9) Answer supervision or busy flash may occur at any time after cut-through.

Thus, the time required to store data in the ticketer (step 8) is after cut-through when switching is complete and time is not at a premium.

A third advantage is provided by the facilities for storing an almost unlimited amount of data by the simple expedient of increasing the number of steps or positions on switch SW1 and the number of storage bins 03–26. As it is, the system stores up to twenty-five bits of data of which:

2 bits identify the ticketer,
3 bits identify the called toll area,
7 bits identify the called number,
7 bits identify the calling number,
1 bit identifies the register, and
5 bits identify time and billing rates.

Thus, the switch SW1 is driven step-by-step first to distribute the data to the storage bins, and second, to thereafter read-out the stored data.

Moreover the ticketer maintains supervision over the toll calls. Thus, the call is cut-through and released when relay 260 opens and closes contacts 468, 469 to interconnect and break tip and ring conductors of selectors 110, 114.

While I have described the above principles of my invention in connection with specific apparatus, it is to be clearly understood that this description is made only by way of example and not as a limitation on the scope of my invention.

I claim:

1. An automatic toll ticketing telephone system comprising means for extending toll calls over any of a plurality of paths through said telephone system, a plurality of ticketing means having a register-sender common thereto, means for preassigning said register-sender to serve an idle one of said ticketing means, said ticketing means including a plurality of data storage devices selectively connected with each of said paths responsive to and for the duration of calls extended thereover, said paths comprising first automatic switching means for connecting a calling line to said ticketing means and second automatic switching means for connecting said ticketing means to a called line, common control means for distributing data relative to said toll calls in said devices, means responsive to the receipt of directory number indicating signals for causing said common control means to distribute switch controlling signals to said storage devices and to said second automatic switching means to extend said toll call, means responsive to the progress of calls extended through said system for causing said ticketing means sequentially to make temporary connection with said common control means while particular data is stored in said devices, means for releasing said equipment immediately after said particular data is stored in said devices, means for completing a connection over said second switching means under the control of said register-sender, and means for thereafter dropping said register-sender and thereafter completing said call under control of said ticketing means.

2. An automatic toll ticketing telephone system comprising means for extending toll calls over any of a plurality of paths through said telephone system, ticketing means including a plurality of data storage devices selectively connected with each of said paths responsive to and for the duration of calls extended thereover, said paths comprising first automatic switching means for connecting a calling line to said ticketing means and said second automatic switching means for connecting said ticketing means to a called line, common control means for transferring data relative to said toll calls into said devices, register-sender means coupled to said ticketing means via a data transfer path for receiving, translating and transmitting directory number indicating signals to said second automatic switching means and thereafter to said ticketing means, means responsive to the receipt of directory number indicating signals for causing said common control means to transfer switch controlling signals to said storage devices, means responsive to the receipt of answer supervision for causing said common control means to store time and date indicating signals in said storage devices, means responsive to the progress of calls extended through said system for causing said ticketing means sequentially to make temporary connections with said control means while particular data is stored in said devices, and means for releasing said common control means immediately after said particular data is stored in said devices.

3. An automatic toll ticketing telephone system comprising means for extending toll calls over any of a plurality of paths through said telephone system, ticketing means including a plurality of data storage devices selectively connected with each of said paths responsive to and for the duration of calls extended thereover, said paths comprising first automatic switching means for connecting a calling line to said ticketing means and second automatic switching means for connecting said ticketing means to a call line, register-sender means common to said ticketing means for controlling said automatic switching means responsive to directory number indicating signals, common control means including register-sender means for distributing data relative to said toll calls into said devices after said ticketing means is connected to said called line, means responsive to the termination of a call for reoperating said common control means to read-out the data stored in said devices, a printer, means responsive to said read-out of said data for operating said printer to make a permanent record of said data, and means for releasing said ticketing means immediately after said data is read-out of said devices.

4. In an automatic telephone system, the combination comprising a plurality of automatic switch trains for extending calls through said system, a plurality of toll ticketing means, each having a plurality of data storage devices associated therewith for storing data relative to toll calls extended through said system, means for individually associating said toll ticketing means with said switch trains responsive to and for the duration of each toll call extended therethrough, at least one register means associated via a data transfer path with an idle one of said plurality of toll ticketing means responsive to an idle ticketing means signal, means thereafter responsive to the receipt of switch directing signals extended through said system for causing said register means to transfer data relative to said call to the devices of said ticketing means, and means responsive to the storage of all said data in said devices for releasing said register.

5. In an automatic telephone system, the combination comprising a plurality of automatic switch trains for extending calls through said system, a plurality of toll ticketing means, each having a plurality of data storage devices, means for individually associating said toll ticketing means with said switch trains responsive to and for the duration of each toll call extended therethrough, register means for controlling said switch trains associated with said plurality of toll ticketing means to cut through said calls and to thereafter transfer data to said storage devices, means responsive to an idle ticketing means signal for causing said register means to seize said idle ticketing means, at least one clock calendar means associated with said plurality of toll ticketing means, means responsive to the receipt of an answer signal for seizing said clock calendar, means responsive to a signal from said ticketing means for causing said clock calendar to transmit time and data indicating signals into said storage devices of said ticketing means, and means responsive to said storage of said time and data indicating signals for releasing said clock calendar.

6. In an automatic telephone system, the combination comprising a plurality of automatic switches for extending calls through said system, a plurality of toll ticketing means, each having a plurality of data storage devices, means for individually associating one of said toll ticketing means with said switches responsive to and for the duration of each toll call extended therethrough, at least one register means associated with said plurality of toll ticketing means, means responsive to an idle ticketing means signal for seizing said register means, means thereafter responsive to the receipt of switch directing signals extended through said system for causing said register means to store data relative to said toll call in the devices of said individually associated ticketing means, means responsive to the storage of all of said data in said devices for releasing said register, at least one clock calendar associated with said plurality of toll ticketing means, means responsive to the receipt of an answer supervision signal maintained for a fixed period of time for seizing said clock calendar, means thereafter responsive to operation of a time-delay means in said ticketing means for causing said clock calendar to store time and date data in said storage devices, and means responsive to the storage of said data in said devices for releasing said clock calendar.

7. In an automatic telephone system, the combination comprising a plurality of automatic switches for extending calls through said system, a plurality of toll ticketing means, each having a plurality of individually associated data storage devices, means for individually associating one of said toll ticketing means with said switches responsive to and for the duration of each toll call extended through said system, at least one register means common to said plurality of toll ticketing means, means responsive to an idle ticketing means signal for connecting said register means with an idle one of said ticketing means, means responsive to the receipt of switch directing signals extended through said system for causing said common register means to store data relative to said call in the devices of said one ticketing means, means responsive to the storage of all of said data in said devices for releasing said register, and means responsive to the termination of a call for reading-out the information in said storage devices.

8. In an automatic telephone system, the combination comprising a plurality of automatic switches for extending calls through said system, a plurality of toll ticketing means each having means for storing data therein, means for individually associating one of said toll ticketing means with said switches responsive to and for the duration of each call extended therethrough, at least one register means associated with said plurality of toll ticketing means, means responsive to an idle ticketing means signal for interconnecting said idle ticketing means and said register means, means thereafter responsive to the receipt of switch directing signals extended through said system for causing said register means to store data relative to said call in the data storage means of said one ticketing means, means for thereafter causing said register means to outpulse for setting at least some of said switches, means responsive to the last named storage of all of said data in said data storage means for releasing said register, at least one clock calendar associated with said plurality of toll ticketing means, means responsive to the receipt of answer supervision for seizing said clock calendar, means responsive to the receipt of answer supervision for a fixed period of time for causing the clock calendar to transfer to the said data storage means time and date signal information, means responsive to the receipt of said signal information for releasing said clock calendar, means including at least one printer associated with said plurality of toll ticketing means, means responsive to termination of said call after transfer of all said information from the register and the clock calendar into said data storage means for causing said toll ticketing means to read-out information from said data storage means, and means responsive to the reading-out of said information from said data storage means for operating said printer means to make a permanent record of data relative to said call.

9. In a telephone system, a tributary office, a ticketing center office, a plurality of trunks extending between the offices, means comprising an automatic toll ticketing system for completing calls between said offices, said toll ticketing system comprising a group of ticketers each having individually associated storage devices and a timing means, means including at least one clock calendar associated with said group of ticketers, means including at least one register associated with said group of ticketers, means including at least one printer associated with said group of ticketers, means responsive to one of said ticketers signaling an idle condition for interconnecting said one ticketer and said register, means responsive to initiation of a toll call in said tributary office for seizing the interconnected ticketer-register combination, means responsive to the receipt of directory number indicating signals for causing said signals to be stored in said register means, means for translating said signals stored in said register, means responsive to the completion of said translating for transmitting the translated signals to the outgoing automatic switch train, means responsive to completion of the transmission of the translated information for transferring said directory number data to the ticketer storage devices, means for releasing said register after said transfer, means responsive to answer supervision for interconnecting the ticketer and said clock calendar and for actuating said timing means, means responsive to the expiration of a period of time measured by said timing means for causing said clock calendar means to transfer time and date information to the ticketer storage devices, means responsive to completion of the transfer of time and date information for releasing said clock calendar means, means responsive to the termination of the call after said measured period of time for interconnecting said ticketer and said printer means, means responsive to the interconnection of the ticketer and said printer means for reading-out said information stored in said ticketer storage devices, and means responsive to receipt of said read-out information for actuating said printer means to make a permanent record of information that was stored in the ticketer storage devices.

10. A ticketer for use in an automatic toll ticketing telephone system, comprising means for storing the data necessary for the production of a record of a toll call, means in said ticketer to supervise the answer and release of the call, a data recording means for preparing permanent records of said data, means responsive to the release of the call for delivering the stored data from said ticketer to said data recording means, means including at least a register and clock calendar external to said ticketer means for controlling the storage of said data in said ticketer after the answer, and means in said ticketer for attracting said register via a data transfer link when said ticketer is idle.

11. The ticketer of claim 10 wherein the means for storing the data necessary for production of the record of the toll call comprises storage relays in said ticketer.

12. The ticketer of claim 10 wherein the means to supervise the answer and release of the call comprises a circuit including only six relays and a timer.

13. The ticketer of claim 10 wherein the means for delivering the stored data to said data recording means comprises a multi-level stepping switch.

14. An automatic toll ticketing telephone system comprising a plurality of ticketing means, at least one register means associated with said plurality of ticketing means, means responsive to one of said ticketing means in idle condition for interconnecting said ticketing means and said register, via a data transfer link, and means responsive to initiation of a call for causing said register to store data in said ticketing means and immediately after said storage to disconnect from said ticketing means.

15. In a toll ticketing system, the combination comprising means including a ticketer individually associated with a toll call connection for the duration of said call, said toll call connection comprising switch train means to complete said connection, means external to said ticketer for registering data signals relative to said call, means responsive to said registered data signals for setting said switch train to complete said connection, means responsive to the operation of said switch train for cutting-through said connection, means responsive to said cut-through for transferring said registered data signals to said ticketer, and means responsive to the completion of said transfer for releasing said register immediately thereafter.

16. A toll ticketing system comprising switching means, ticketing means, means responsive to the receipt of a toll access code for interconnecting said ticketing means and a calling line via said switching means, registering means external to said ticketing means operated responsive to the receipt of terminating number indicating signals for registering said number, means comprising a data transfer link for interconnecting said switching means and said ticketing means, means for setting said switching means to seize a called line in accordance with said registered number, means for cutting said calling line through to said called line, means for thereafter transferring said registered number into storage and releasing said register means, and means responsive to termination of a call for making a record of said stored data.

References Cited by the Examiner

UNITED STATES PATENTS

| | | | |
|---|---|---|---|
| 2,273,165 | 2/42 | Wright | 179—7.1 |
| 2,352,492 | 6/44 | Ostline | 179—7.1 |
| 2,586,704 | 2/52 | Ostline | 179—7.1 |
| 2,678,353 | 5/54 | Ostline | 179—7.1 |

ROBERT H. ROSE, *Primary Examiner.*

L. MILLER ANDRUS, WALTER L. LYNDE,
*Examiners.*